(12) United States Patent
Tsujikawa

(10) Patent No.: US 10,986,266 B2
(45) Date of Patent: Apr. 20, 2021

(54) PROGRAMMABLE LOGIC CONTROLLER AND CAMERA INPUT EXPANSION UNIT

(71) Applicant: Keyence Corporation, Osaka (JP)

(72) Inventor: Ryosuke Tsujikawa, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/562,468

(22) Filed: Sep. 6, 2019

(65) Prior Publication Data
US 2020/0259998 A1 Aug. 13, 2020

(30) Foreign Application Priority Data
Feb. 12, 2019 (JP) .............................. JP2019-023076

(51) Int. Cl.
*H04N 5/232* (2006.01)
*H04L 29/08* (2006.01)
*G05B 19/05* (2006.01)

(52) U.S. Cl.
CPC ....... *H04N 5/23222* (2013.01); *G05B 19/056* (2013.01); *H04L 67/26* (2013.01); *G05B 2219/163* (2013.01)

(58) Field of Classification Search
CPC .. H04N 5/23222; H04L 67/26; G05B 19/056; G05B 2219/163; G05B 19/41815; G05B 19/05
See application file for complete search history.

(56) References Cited

U.S. PATENT DOCUMENTS 5,754,227 A * 5/1998 Fukuoka .............. H04N 1/2137
348/231.6
10,319,087 B2 * 6/2019 Oka ................. G05B 19/41875

FOREIGN PATENT DOCUMENTS

JP 2001-125612 A 5/2001

OTHER PUBLICATIONS

U.S. Appl. No. 16/562,464, filed Sep. 6, 2019 (232 pages).
U.S. Appl. No. 16/562,467, filed Sep. 6, 2019 (227 pages).

* cited by examiner

*Primary Examiner* — Ahmed A Berhan
(74) *Attorney, Agent, or Firm* — Kilyk & Bowersox, P.L.L.C.

(57) ABSTRACT

A camera input expansion unit includes a camera-setting-information storage, a camera expansion processor, an image-recorder, and an image capture interface. The camera-setting-information storage stores setting information on the camera including the conditions of the image capture trigger. The camera expansion processor generates an ON/OFF signal for defining the image capture trigger based on the setting information of the camera. Based on the ON/OFF signal as the image capture trigger, the camera expansion processor acquires the image data which is generated by the camera. The image-recorder records the image data acquired by the camera expansion processor. The image capture interface is provided between the camera expansion processor and the camera. The image capture interface has an image-capture-trigger line propagating the ON/OFF signal to the camera and an image communication line propagating the image data generated by the camera to the camera expansion processor.

17 Claims, 24 Drawing Sheets

PROGRAMMABLE LOGIC CONTROLLER AND CAMERA INPUT EXPANSION UNIT

CROSS-REFERENCE TO RELATED APPLICATIONS

The present application claims priority under 35 U.S.C. § 119 to Japanese Patent Application No. 2019-023,076, filed on Feb. 12, 2019, the content of which is incorporated herein by reference in their entirety.

BACKGROUND OF THE INVENTION

1. Field of the Invention

The present invention relates to a programmable logic controller and a camera input expansion unit.

2. Description of the Related Art

Programmable logic controllers (hereinafter also referred to as "PLCs" are controllers for controlling manufacturing equipment, conveying devices, and inspection devices in factory automation (FA). PLCs execute user programs (e.g., ladder programs) written by users whereby controlling various types of expansion units and to-be-controlled equipment. When a user actually runs his/her user program on a PLC, the user sometimes finds an unexpected event, which is unexpected at the time of the user program writing. In this case, the user necessarily corrects the program. To identify a part to be corrected, the user will not only review the user program but also check log data that is recorded by the PLC. The log data includes values which are collected from devices (device values) when the user program is executed. In the field of the PLC, the device refers to a storage area for storing information. Examples of the devices can be provided by a relay device which can store 1-bit information, a word device which can store 1-word information, and the like.

For example, a system is known which includes such a programmable logic controller (PLC) and a video camera that are connected to each other through a communication network in order to monitor production facilities by using camera images. In this system, if a facility trouble occurs, camera images before and after the trouble occurrence are analyzed to diagnose the cause of the trouble.

See Japanese Patent Laid-Open Publication No. JP 2001-125,612 A.

SUMMARY OF THE INVENTION

However, if a difference exists between the time of acquisition of device value in the PLC and the time of acquisition of camera image, the diagnosis of the trouble will take time and manpower. For this reason, such a time difference is preferably kept as small as possible. On the other hand, there is a problem that the both times cannot be easily synchronized with each other because of communication delay.

Therefore, it is one object of the present invention to provide a programmable logic controller and a camera input expansion unit which can obtain precise time synchronization with device records.

A programmable logic controller according to an aspect of the present invention includes a CPU-mounted unit, and a camera input expansion unit. The CPU-mounted unit executes a user program, and can monitor or control external equipment by repeatedly executing the user program. The camera input expansion unit is electrically connected to the CPU-mounted unit through a bus, and can be connected to a camera. The camera can capture an image of a predetermined area based on an image capture trigger generated in said programmable logic controller, and generate image data corresponding to the captured predetermined area. The camera input expansion unit includes a camera-setting-information storage portion, a camera expansion unit processor, an image-recorder, and an image capture interface. The camera-setting-information storage portion stores setting information on the camera including the conditions of the image capture trigger. The camera expansion unit processor generates an ON/OFF signal for defining the image capture trigger based on the setting information on the camera, which is stored in the camera-setting-information storage portion. Based on the ON/OFF signal as the image capture trigger, the camera expansion unit processor acquires the image data which is sent from the camera. The image-recorder records the image data which is acquired by the camera expansion unit processor. The image capture interface is provided between the camera expansion unit processor and the camera. The image capture interface has an image-capture-trigger line propagating the ON/OFF signal to the camera, and an image communication line propagating the image data which is sent from the camera to the camera expansion unit processor.

According to another aspect, a camera input expansion unit is provided which can be electrically connected through a bus to a CPU-mounted unit for forming a programmable logic controller. The camera input expansion unit includes a camera-setting-information storage portion, a camera expansion unit processor, an image-recorder, and an image capture interface. The camera-setting-information storage portion stores setting information including conditions of an image capture trigger for a camera that can capture an image of a predetermined area based on the image capture trigger from the programmable logic controller, and can generate image data corresponding to the captured predetermined area. The camera expansion unit processor generates an ON/OFF signal for defining the image capture trigger based on the setting information on the camera, which is stored in the camera-setting-information storage portion. Based on the ON/OFF signal as the image capture trigger, the camera expansion unit processor acquires the image data which is generated by the camera. The image-recorder records the image data which is acquired by the camera expansion unit processor. The image capture interface is provided between the camera expansion unit processor and the camera. The image capture interface has an image-capture-trigger line propagating the ON/OFF signal to the camera and an image communication line propagating the image data which is generated by the camera to the camera expansion unit processor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Figure 1:
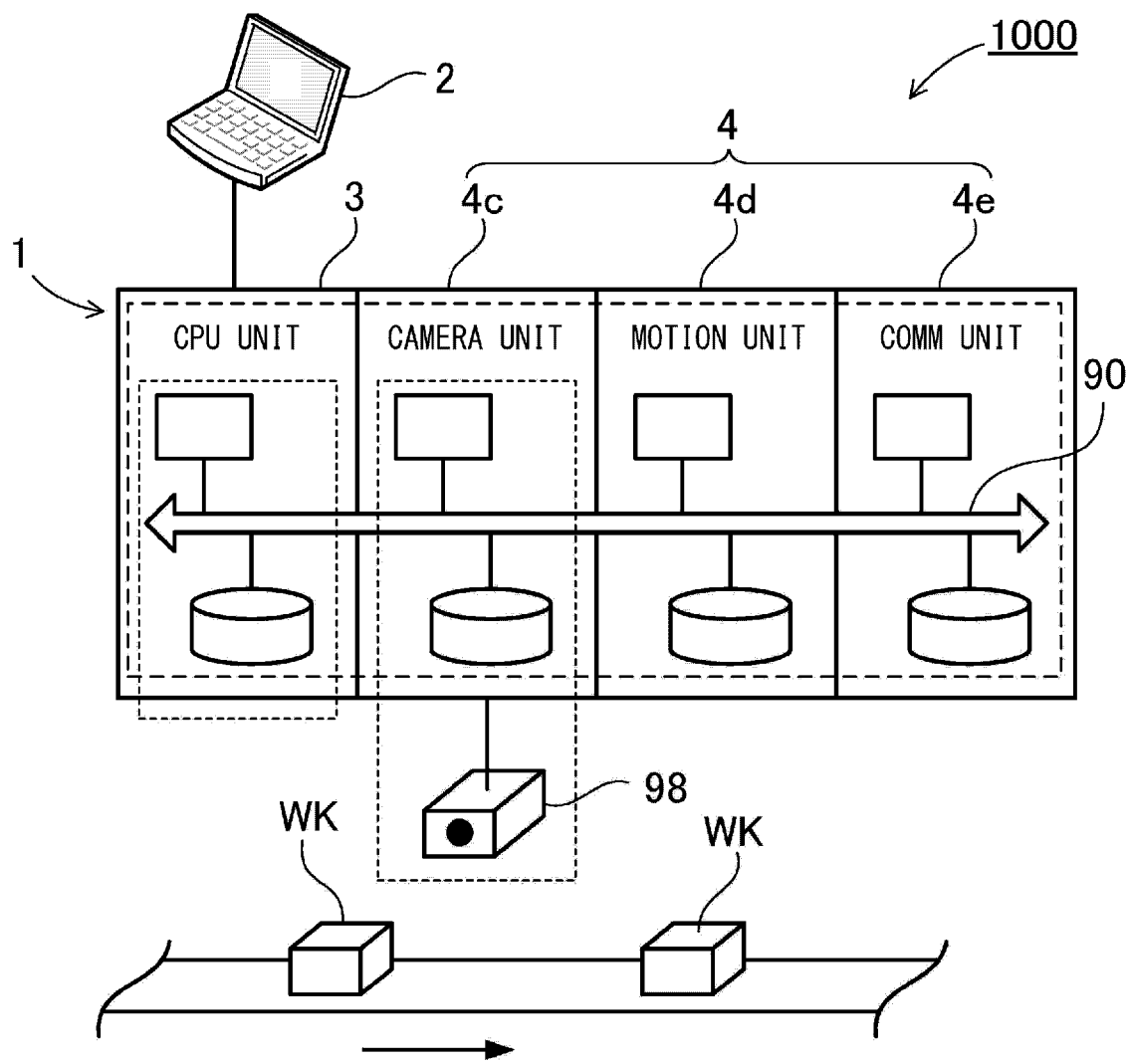
FIG. 1 is a conceptual illustration of a programmable-logic-controller system.

The embodiments will now be described with reference to the accompanying drawings, wherein like reference numerals designate corresponding or identical elements throughout the various drawings. It should be appreciated, however, that the embodiments described below are illustrations of a programmable logic controller and a camera input expansion unit to give a concrete form to technical ideas of the invention, and a programmable logic controller and a camera input expansion unit of the invention are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element.

According to the programmable logic controller according to another aspect, in addition to the aforementioned aspect, the user program which can be executed by the CPU-mounted unit can be written in a programming support device that can be connected to the CPU-mounted unit.

The setting information on the camera which is stored in the camera-setting-information storage portion can include setting information that can be created by the programming support device and is received through the CPU-mounted unit.

According to the programmable logic controller according to another aspect, in addition to any of the aforementioned aspects, a base plate can be provided that holds the CPU-mounted unit and the camera input expansion unit.

The camera input expansion unit can be electrically connected through the bus in the base plate to the CPU-mounted unit.

According to the programmable logic controller according to another aspect, in addition to any of the aforementioned aspects, the image-recorder can be configured to record the image data which is acquired by the camera expansion unit processor and the information on time of its corresponding image data acquisition which are associated with each other in chronological order, and to provide the image data and the information on time of its corresponding image data acquisition based on instruction from the CPU-mounted unit. According to this aspect, the programmable logic controller can obtain precise time synchronization with device records relating to the captured image data generated by the camera. In particular, since the ON/OFF signal is transmitted through the dedicated image-capture trigger line not through the communication line and without command interpretation, time delay can be avoided by such precise time synchronization.

According to the programmable logic controller according to another aspect, in addition to the aforementioned aspect, the image-capture-trigger line can be a non-communication line. According to this aspect, since the image capture trigger is provided not by communications but by I/O of ON/OFF, the image capture trigger can be provided at a very high speed as compared with transmission of image capture commands by communications.

According to the programmable logic controller according to another aspect, in addition to any of the aforementioned aspects, the image-capture interface can further include a power supply interface to supply electric power to the camera.

The image communication line, the image-capture-trigger line, and the power supply line can be bundled together, and can form a camera connection cable that connects the image-capture interface and the camera to each other. According to this aspect, transmission/reception of all the electric signals for operating the camera (including power supply) can be performed simply by connecting the camera input expansion unit and the camera to the image capture interface. As a result, wiring can be simple. Therefore, the structure of the programmable logic controller can be simplified.

According to the programmable logic controller according to another aspect, in addition to any of the aforementioned aspects, the transmission speed of the image-communication line can be not smaller than 130 Mbps. According to this aspect, the image data can be transmitted at a high speed higher than communication lines such as Ethernet.

According to the programmable logic controller according to another aspect, in addition to any of the aforementioned aspects, the camera expansion unit processor can include an image-capture-trigger generator and a collection portion.

The image-capture-trigger generator generates the ON/OFF signal to be provided to the camera through the image-capture-trigger line.

The collection portion associates the information on time of generation of the ON/OFF signal with its corresponding image data which can be generated by the camera, and records the associated information on time and image data into the image-recorder. According to this aspect, the camera expansion unit processor can be constructed in a common SoC or the like.

According to the programmable logic controller according to another aspect, in addition to any of the aforementioned aspects, the CPU-mounted unit can include its own time manager, and the camera input expansion unit can include its own time manager.

Times of the CPU-mounted unit and the camera input expansion unit are synchronized with each other by using the time managers, which are included in the CPU-mounted unit and the camera input expansion unit.

According to the programmable logic controller according to another aspect, in addition to any of the aforementioned aspects, the time manager can be a counter.

The information on time of image data acquisition is a counter value.

According to the programmable logic controller according to another aspect, in addition to any of the aforementioned aspects, the camera expansion unit processor can be configured to control the image capture trigger based on a ladder program in which the image capture trigger is described.

According to the programmable logic controller according to another aspect, in addition to any of the aforementioned aspects, the ON/OFF signal for defining the image capture trigger can be provided based on any of a timer, an external input, and abnormality detection.

According to the programmable logic controller according to another aspect, in addition to any of the aforementioned aspects, the camera expansion unit processor can be configured to interpret or execute the protocol of refresh communication that is executed by the camera expansion unit in each scan, or for transmission to another expansion unit.

According to the programmable logic controller according to another aspect, in addition to any of the aforementioned aspects, two or more camera input expansion units as the camera input expansion unit can be provided. According to this aspect, since the programmable logic controller includes two or more camera input expansion units which can provide synchronized triggers, this programmable logic controller can have higher extensibility.

According to the programmable logic controller according to another aspect, in addition to any of the aforementioned aspects, images of a common object can be captured from different directions by cameras that can be connected to their corresponding one of the two or more camera input expansion units and synchronized with each other. According to this aspect, since synchronized images of a common object can be captured from different directions, the object can be inspected in more detail.

According to the programmable logic controller according to still another aspect, in addition to any of the aforementioned aspects, images of a common object can be captured at a different phase(s) by cameras that can be connected to their corresponding one of the two or more camera input expansion units. According to this aspect, since images of a common object can be captured out of phase, FPS (frames per second) can be substantially increased. Therefore, the motion of the object can be inspected in more detail.

FIG. 1 is a schematic diagram of a programmable-logic-controller system 1000. The illustrated programmable-logic-controller system 1000 is an exemplary system which captures images of objects WK which are conveyed along a production line by using a camera 98 whereby inspecting the objects WK. The programmable-logic-controller system 1000 is connected to a PC 2 so that a project data editing program can be edited.

A programmable logic controller 1 includes a plurality of units connected to each other. The units can communicate with each other via a unit-to-unit bus 90. Broadly speaking, the unit is constructed of a CPU-mounted unit 3 and expansion units 4. The CPU-mounted unit 3 is also referred to as a main unit or a basic unit, and performs the elementary actions of a programmable logic controller. The expansion unit 4 is a functional expansion unit which expands the functions of the CPU-mounted unit 3. In the exemplary system shown in FIG. 1, the expansion units 4 are a camera input expansion unit 4c, a motion unit 4d, and a communication unit 4e. The camera input expansion unit 4c which is one type of the expansion units 4 is connected to the camera 98 so that images of the objects WK are captured based on predetermined timing. The camera input expansion unit 4c provides the images to the CPU-mounted unit. The motion unit 4d is also referred to as a positioning unit, and controls the positions (also called axes) of the object to be controlled. Generally, a driving source such as an electric motor is provided for each axis. The communication unit 4e can communicate with external equipment. The CPU-mounted unit 3 collects data from the expansion units 4, and controls their required operations.

<System Configuration>

For better understanding of a person skilled in the art about the programmable logic controller (hereinafter occasionally referred to as "PLC"), a typical configuration of PLC and its operations are now described.

Figure 2:
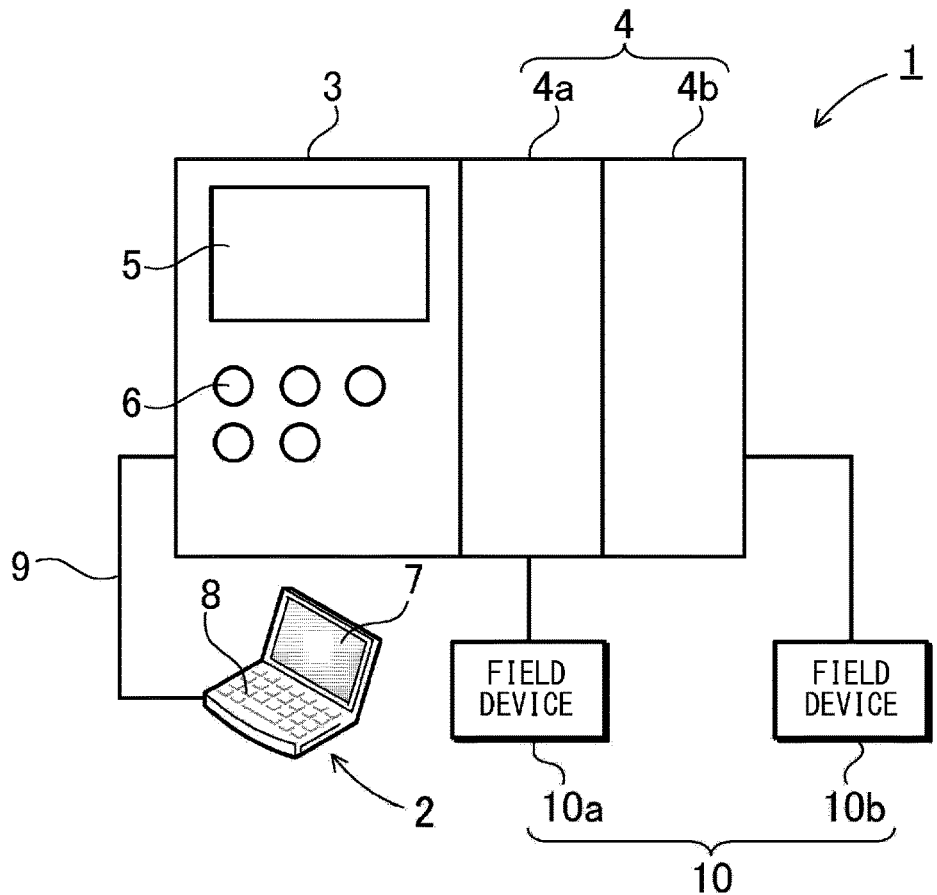
FIG. 2 is a diagram showing the programmable-logic-controller system.

FIG. 2 is a conceptual diagram showing an exemplary configuration of a programmable-logic-controller system according to an embodiment of the present invention. As shown in FIG. 2, the system includes the PC 2 which can edit user programs such as ladder programs, and a PLC 1 which performs control over various types of controlling devices installed in a factory or the like. PC is the abbreviated name for a personal computer. The user programs may be written by using ladder language, graphical programming languages such as a motion program in flowchart format (e.g., SFC (sequential function chart)), or high-level programming languages such as C language. Hereinafter, a ladder program is illustratively used as the user program for ease of explanation. The PLC 1 is constructed of the CPU-mounted unit 3 which includes a CPU, and one or more expansion units 4. One or more expansion units 4 are removably mounted to the CPU-mounted unit 3. For example, the expansion unit 4a can be a positioning unit that drives an electric motor (field device 10a) and positions a workpiece, while the expansion unit 4b can be a counter unit. The counter unit counts signals from an encoder (field device 10b) such as a manual pulser. Letters a, b, c, . . . which are attached to the last digit of reference signs are occasionally omitted. The system which includes PLC 1 and PC 2 can be called a programmable-logic-controller system.

The CPU-mounted unit 3 includes a PLC-side display portion 5 and a PLC-side console 6. The PLC-side display portion 5 can display the operation status and the like of the expansion units 4 mounted to the CPU-mounted unit 3. The PLC-side display portion 5 can change its screen in accordance with user's operation on the PLC-side console 6. The PLC-side console 6 can be buttons or the like which are integrally incorporated in the CPU-mounted unit 3, or an external input unit such as console, mouse, a keyboard, or the like. Alternatively, the PLC-side display portion 5 can be a touch panel which also serves as the console.

The PLC-side display portion 5 usually displays current values of the device (device values) in the PLC 1, error information on errors which occur in the PLC 1, and the like. The device refers to an area which is provided in a memory to store a device value (device data). The device can be called a device memory. The device value is information which indicates the input status provided from the input device, the output status provided to output equipment, or the status of an internal relay (auxiliary relay), a timer, a counter or a data memory which is defined in the user program. Device values can be categorized into bit and word types. Bit devices store one bit of device value. Word devices store one word of device value.

The expansion units 4 are prepared to expand the functions of the PLC 1. The field devices (devices to be controlled) 10 corresponding to the functions of the expansion units 4 are connected to their corresponding expansion unit 4. As a result, the field devices 10 are connected to the CPU-mounted unit 3 through their expansion units 4. The field devices 10 can be input equipment such as a sensor or a camera, or output equipment such as an actuator. Two or more field devices can be connected to one expansion unit 4.

(Engineering Tool for Programmable Logic Controllers)

The PC 2 realizes an engineering tool for programmable logic controllers (hereinafter occasionally called a "PLC engineering tool"). The PLC engineering tool is a component which is connected to the PLC 1 and performs setting, control during actual operations, confirmation of the operations, and the like. Also, the PLC engineering tool can create various types of programs which instruct operations of the PLC 1 or the programmable-logic-controller system including the PLC 1, and edit and correct the created program. In this sense, the PLC engineering tool can be called a programming support device. The PLC engineering tool can produce the operations of the devices based operation record data which records past operations of the programmable-logic-controller system. The operation record data includes project data including a user program such as a ladder program and setting data such as unit configuration information of units, and log data as actual operation data including device values of devices and image data of a camera during actual operations. The PLC engineering tool may read the project data in the operation record data, and edit the project data. In this sense, the PLC engineering tool may be called a project data editing program.

For example, the PC 2 is a portable note or tablet type personal computer, includes a display portion 7 and a PC-side console 8. A ladder program as an exemplary user program for controlling the PLC 1 is written by using the PC 2. The written ladder program is translated into mnemonic code in the PC 2. The PC 2 is connected to the CPU-mounted unit 3 of the PLC1 via a communication cable 9 such as USB (Universal Serial Bus), and provides the CPU-mounted unit 3 with the ladder program which has been translated into the mnemonic code. The CPU-mounted unit 3 translates the ladder program into machine code, and stores the machine code in a memory which is included in the CPU-mounted unit 3. Although mnemonic code is provided to the CPU-mounted unit 3 in this embodiment, the present invention is not limited to this. For example, the PC 2 may translate the mnemonic code into intermediate code, and provide the intermediate code to the CPU-mounted unit 3.

Although not shown in FIG. 2, the PC-side console 8 of the PC 2 can include a pointing device such as a mouse which is connected to the PC 2. The PC 2 may be removably connected via another communication cable 9 other than USB to the CPU-mounted unit 3 of the PLC 1. Alternatively, the PC 2 may be wirelessly connected to the CPU-mounted unit 3 of the PLC 1 without communication cable 9.

<Ladder Program>

Figure 3:
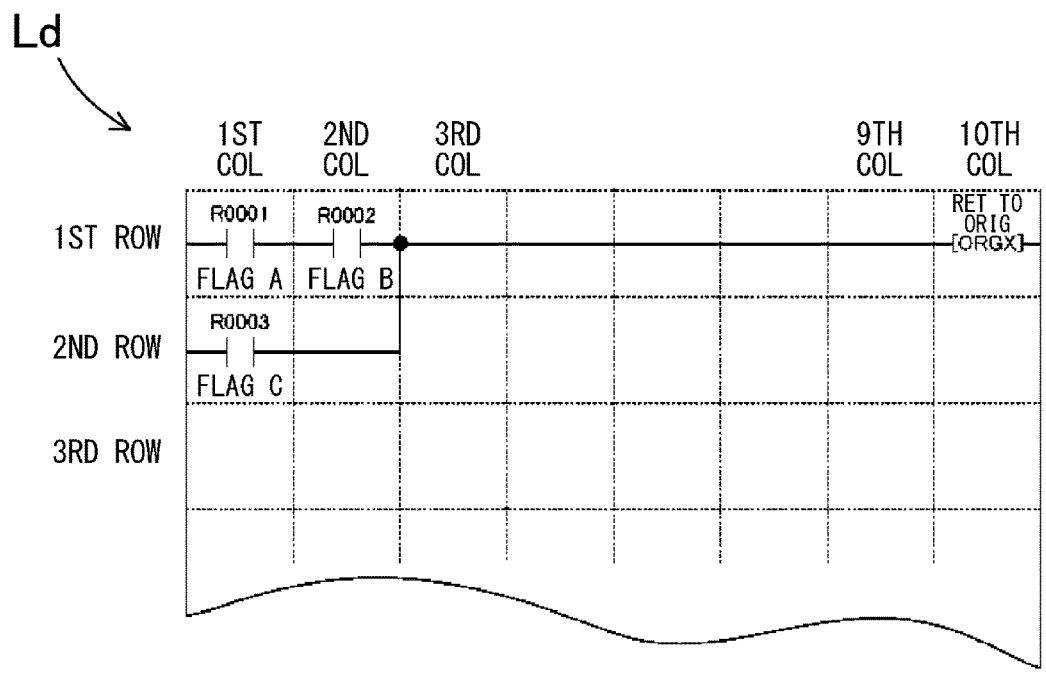
FIG. 3 is a diagram illustrating a ladder program.

FIG. 3 is a diagram showing an example of ladder diagram Ld which will be displayed on the display portion 7 of the PC 2 when the ladder program is written. The PC 2 displays a number of cells arranged in a matrix shape on the display portion 7. A symbol of a virtual device can be arranged in the cell. The symbol indicates an input relay, an output relay, or the like. A relay circuit is formed by such a number of symbols. For example, the ladder diagram Ld has ten columns and N rows of cells (N is an arbitrary natural number). A symbol of a virtual device can be suitably arranged in the cell in each row.

The relay circuit shown in FIG. 3 is formed by suitably connecting three symbols of virtual devices (hereafter called "input devices") which are turned ON/OFF based on input signals from the input equipment and a symbol of a virtual device (hereafter called an "output device") which is turned ON/OFF in order to control operation of the output equipment to each other.

Alphanumeric characters ("R0001", "R0002", and "R0003") which are indicated above the symbols of the input devices represent the device names (address names) of the input devices. Letters ("flag A", "flag B", and "flag C") which are indicated under the symbols of the input devices represent device comments correlated with these input devices. Letters ("Ret to Orig") which are indicated above the symbols of the output devices represent a label as text which indicates the function of the output device.

In the example shown in FIG. 3, the two symbols of the input devices corresponding to the device names "R0001" and "R0002" are connected in series to each other so that an AND circuit is formed. In addition, the symbol of the input device corresponding to the device name "R0003" is connected in parallel to the AND circuit, which is formed by the two symbol of the input devices, so that an OR circuit is formed. That is, in this relay circuit, when both the input devices corresponding to the two symbols in the first row are turned ON, or when the input device corresponding to the symbol in the second row is turned ON, the output device corresponding to the symbol of the first row is only turned ON.

<Programming Support Device>

Figure 4:
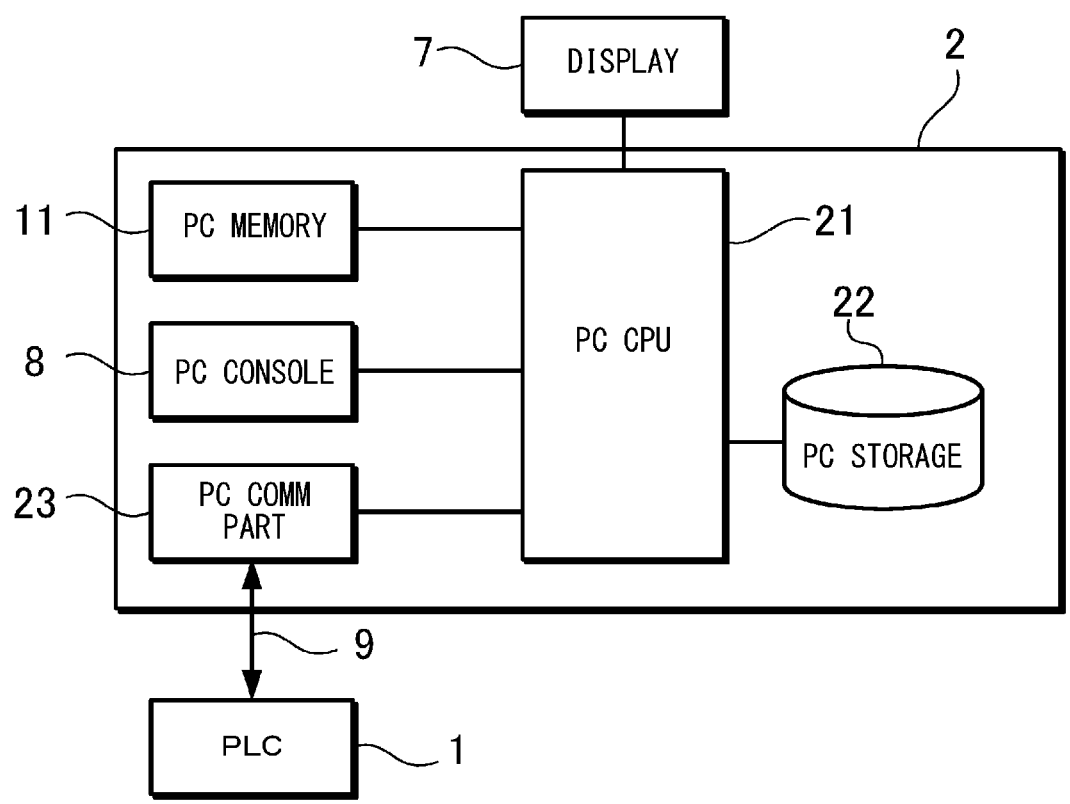
FIG. 4 is a diagram illustrating a programming support device.

FIG. 4 is a block diagram illustrating the electrical configuration of the PC 2. The PC 2 includes a PC-side memory portion 11, a PC-side CPU 21, the display portion 7, the PC-side console 8, a PC-side storage device 22, and the PC-side communication portion 23 as shown in FIG. 4. The display portion 7, the PC-side console 8, the PC-side storage device 22, and the PC-side communication portion 23 are electrically connected to the PC-side CPU 21.

The PC-side memory portion 11 is a scratch-pad memory which provides work space for processing of the PC-side CPU 21, and is typically constructed of a RAM or the like. The operation record data includes project data.

The PC-side storage device 22 can include a hard disk drive, a semiconductor memory, ROM and the like, and may additionally include a removable memory card. CPU is the abbreviated name for a central processing unit. ROM is the abbreviated name for a read only memory. RAM is the abbreviated name for a random access memory.

Users run editing software as a computer program stored in the PC-side storage device 22 on the PC-side CPU 21 whereby editing the project data by operating the PC-side console 8. This editing software corresponds to a project-data editing program.

(Project Data)

The project data includes one or more user programs (e.g., ladder programs), unit configuration information on the CPU-mounted unit 3 and the expansion units 4, and the like. The project data may include program configuration information which represents what types of program parts form the user program. The unit configuration information includes the connection points of the expansion units 4 to the CPU-mounted unit 3, information representing the functions of the CPU-mounted unit 3 (e.g., communication function and positioning function), information representing the functions and the like of the expansion units 4 (e.g., image-capturing function).

Project data editing includes project data creation and modification. The project data created by using the project data editing program is stored in the PC-side storage device 22. Users can read the project data stored in the PC-side storage device 22, and modify the project data by using the project data editing program if necessary. The PC 2 is connected to the CPU-mounted unit 3 via the communication cable 9, and can communicate with the CPU-mounted unit 3 through the PC-side communication portion 23. The PC-side CPU 21 transmits the project data to the CPU-mounted unit 3 through the PC-side communication portion 23.

The project data editing program includes editing, monitoring, and hysteresis modes. The editing mode is also called an edit mode, and the like. The project data can be edited in the editing mode. Simulations run in the monitoring mode for user program debugging, and the like. The hysteresis mode is also called a replay mode, time-machine reproduction, and the like. Hysteresis can be reproduced in the hysteresis mode. The editing, monitoring, and hysteresis modes can be switched from one to another by a mode selection portion.

<PLC 1>

Figure 5:
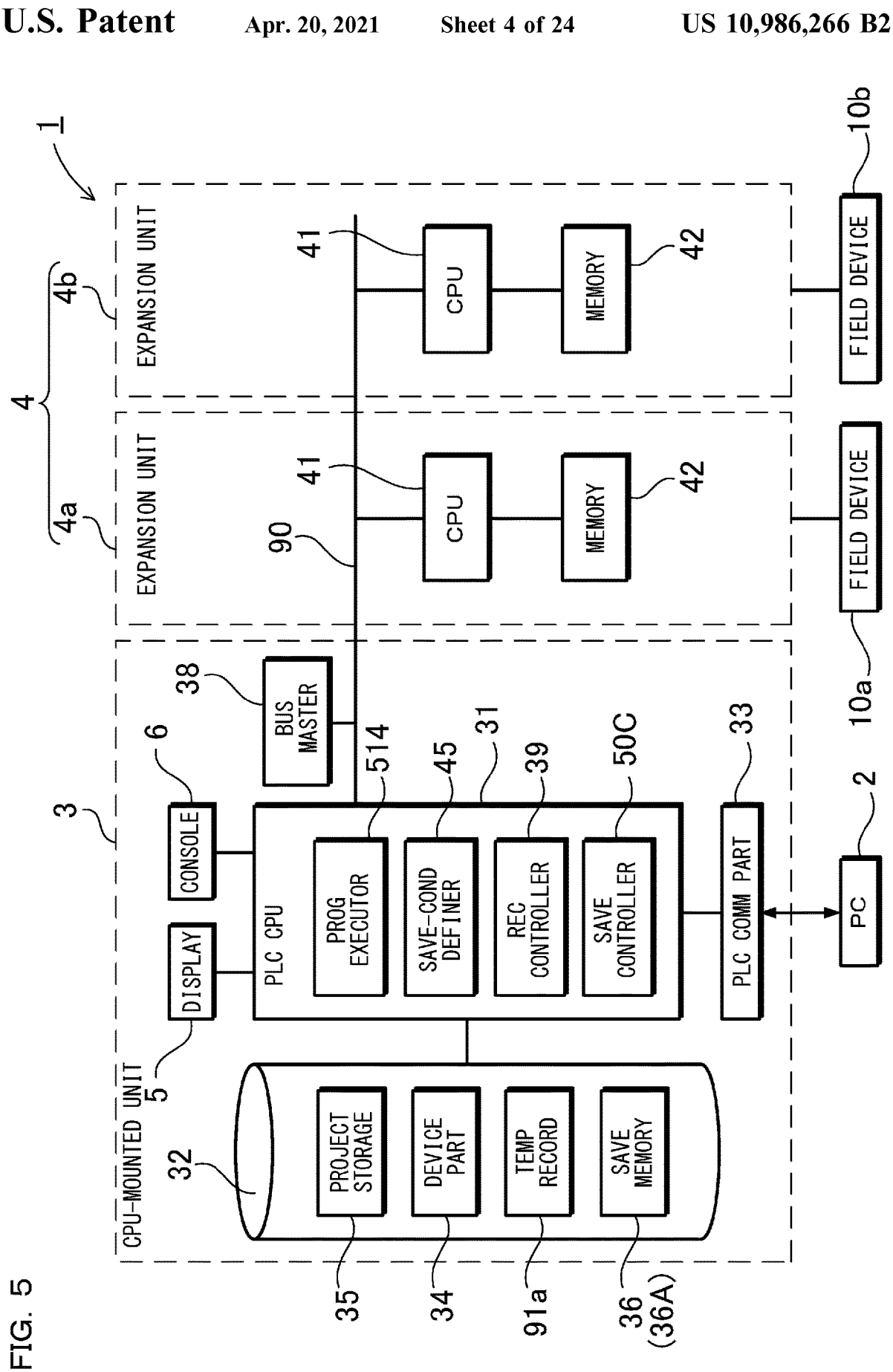
FIG. 5 is a diagram illustrating a PLC.

FIG. 5 is a block diagram illustrating the electrical configuration of the PLC 1. As shown in FIG. 5, the CPU-mounted unit 3 includes a PLC-side CPU 31, the PLC-side display portion 5, the PLC-side console 6, a PLC-side storage device 32, and a PLC-side communication portion 33. The PLC-side display portion 5, the PLC-side console 6, the PLC-side storage device 32, and the PLC-side communication portion 33 are electrically connected to the PLC-side CPU 31.

(PLC-Side Storage Device 32)

The PLC-side storage device 32 includes a project storage portion 35, a device portion 34, a temporary recording portion 91a, and a save memory 36.

The project storage portion 35 stores the project data provided from the PC 2. Also, the PLC-side storage device 32 stores a control program for the CPU-mounted-unit 3.

The device portion 34 includes bit and word devices, and the like. Each device stores a device value. The device portion 34 serves as a device memory which stores device values of the devices. The device portion 34 may also serve as a storage area to be referenced based the user program.

The temporary recording portion 91a records the device values stored in the device portion 34 in chronological order. The temporary recording portion 91a can be constructed of a ring buffer, or the like.

The save memory 36 saves the device values that are recorded in the temporary recording portion 91a in chronological order. The save memory 36 is constructed as a nonvolatile memory of an internal memory 37, a removable memory card 36A, or the like.

The PLC-side storage device 32 has a plurality of storage areas. The PLC-side storage device 32 may also include a RAM, ROM, memory card, or the like. For example, in the example shown in FIG. 5, the save memory 36 is constructed of the removable memory card 36A.

(PLC-Side CPU 31)

The PLC-side CPU 31 includes a program-execution portion 514, a save-condition setting portion 45, a record control portion 39, and a save control portion 50C. The program-execution portion 514 serves as a ladder-execution engine 80a which repeatedly executes the user program. The device portion 34 which is a storage area to be referred by the program-execution portion 514 based on the user program stores device values of the devices.

The save-condition setting portion 45 is a component which defines various types of conditions. In this embodiment, the save-condition setting portion 45 defines first and second trigger conditions, and a buffer record period. The first trigger conditions relate to a record trigger for triggering the temporary recording portion 91a to record device values. The second trigger conditions relate to a save trigger for triggering the save memory 36 to save the device values. The buffer record period relates to a period for which the temporary recording portion 91a temporarily records the device values. The buffer record period includes at least one of the period to a reference time and the period from the reference time. The reference time is determined by the record trigger.

The save-condition setting portion 45 can define conditions of the record start trigger for starting the recording of device values into the temporary recording portion 91a as the first trigger conditions. Also, the save-condition setting portion 45 can define a certain period from the reference time determined by the record start trigger as the buffer record period.

If the first trigger conditions relating to the record trigger are satisfied, the record control portion 39 records chronological device values corresponding to the buffer record period, which is a certain period from the reference time determined by the record trigger, as log data into the temporary recording portion 91a. The record control portion 39 holds the recorded log data in the temporary recording portion 91a until earlier time that the second trigger conditions relating to the save trigger are satisfied or the first trigger conditions relating to the record trigger are satisfied again. If the first trigger conditions relating to the record trigger are satisfied again, the record control portion 39 records chronological device values corresponding to the buffer record period, which is a certain period from the reference time determined by a new record trigger, as log data in the temporary recording portion 91a.

The save control portion 50C saves, into the save memory 36, the log data which is held by the record control portion 39 in the temporary recording portion 91a, if the second trigger conditions relating to the save trigger are satisfied. At that time, when the second trigger conditions relating to the save trigger are satisfied so that a new save trigger is generated, the save control portion 50C preferably saves, into the save memory, log data that is held by the record control portion 39 in the temporary recording portion 91a and corresponds to the latest record trigger before this new save trigger is generated. In this case, the save control portion 50C holds the log data which is recorded during the buffer record period even after the buffer record period has elapsed, and then saves the log data that is held corresponding to the latest record trigger if the new save trigger is generated. It should be noted that log data that is held in the record control portion 39 is not limited to the log data that is held corresponding to the latest record trigger but can be log data that is held corresponding to the second or third latest record trigger.

As shown in FIG. 5, the CPU-mounted unit 3 and the expansion unit 4 are connected via the unit-to-unit bus 90 which is one type of expansion bus. The communication functions relating to the unit-to-unit bus 90 may be included as a part of the PLC-side communication portion 33. In addition, the PLC-side communication portion 33 may have a network communication circuit. The PLC-side CPU 31 may transmit log data and the like to the PC 2, Cloud, and the like through the PLC-side communication portion 33.

The unit-to-unit bus 90 is now further described. The unit-to-unit bus 90 is a bus in which input/output refresh or the like is performed as discussed below. The communication control in the unit-to-unit bus 90 is realized by a so-called bus master 38 (the bus master may be provided as a part of the PLC-side communication portion 33, or the bus master 38 may be formed as a part of the PLC-side CPU 31). The bus master 38 is a control circuit which controls the communication via the unit-to-unit bus 90, and performs communication such as later-discussed input/output refresh or the like between the expansion units 4 based on a communication request from the PLC-side CPU 31.

The expansion unit 4 includes a CPU 41 and a memory 42. The CPU 41 controls the field device 10 based on the instruction (device value), which is stored in the device, from the CPU-mounted unit 3. The CPU 41 stores the control result of the field device 10 in the device which is called a buffer memory. The control result stored in the device is transmitted to the CPU-mounted unit 3 in the input/output refresh. The control result stored in the device is transmitted to the CPU-mounted unit 3 based on a read instruction from the CPU-mounted unit 3 even if it is not the timing of input/output refresh. The memory 42 includes a RAM, a ROM, and the like. In particular, RAMs can surely provide a storage area to be used as a buffer memory. Also, the memory 42 may have a buffer which temporarily holds the data (e.g., still image data and moving-image data) acquired by the field device 10.

Figure 6:
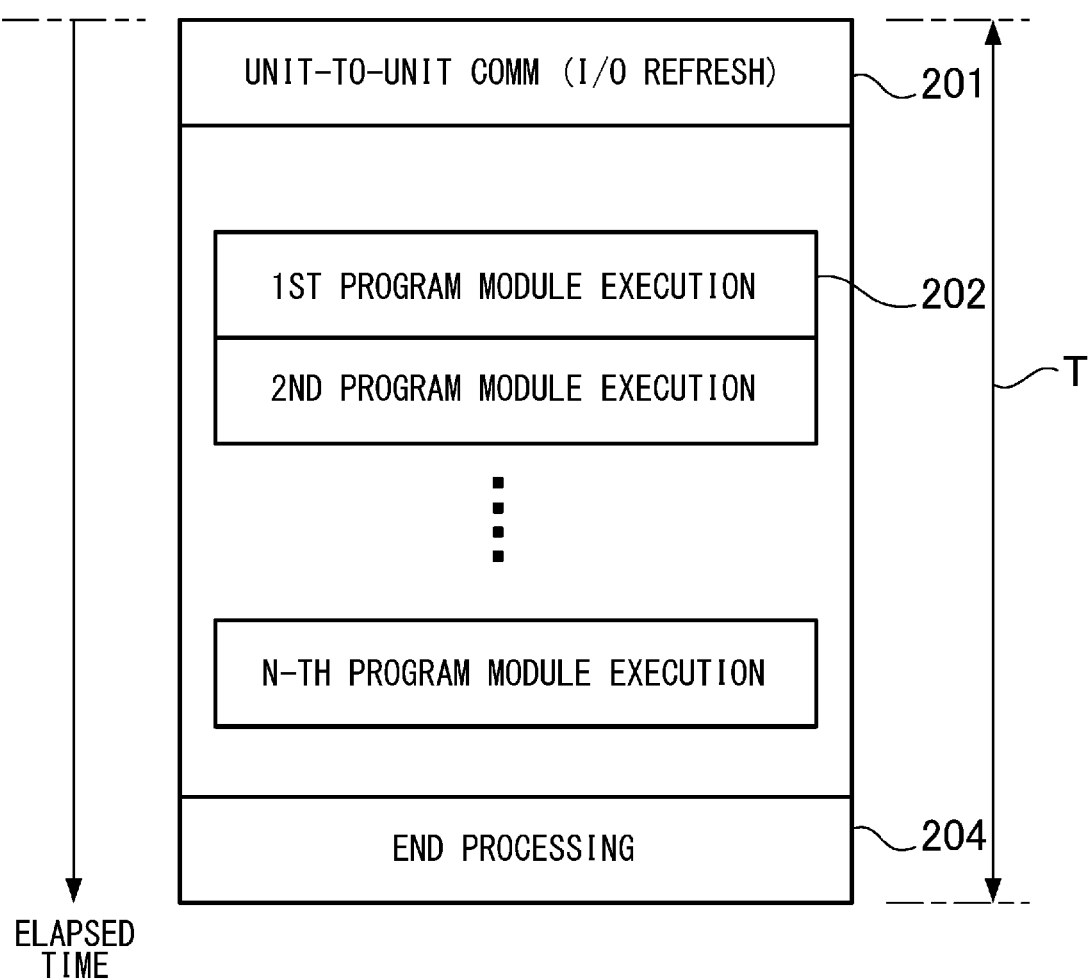
FIG. 6 is a diagram illustrating the scan of the ladder program.

FIG. 6 is a schematic diagram showing scan time of the CPU-mounted unit 3. As shown in FIG. 6, a single cycle of scan time T is formed of unit-to-unit communication 201 for input/output refresh, program execution 202, and END processing 204. In the unit-to-unit communication 201, the CPU-mounted unit 3 transmits output data obtained by executing the ladder program from the PLC-side storage device 32 in the CPU-mounted unit 3 to the external equipment such as the expansion units 4. Also, the CPU-mounted unit 3 receives input data from the external equipment such as the expansion units 4, and stores the input data into the PLC-side storage device 32 in the CPU-mounted unit 3. In other words, the device of the expansion unit 4 is changed to the device value stored in the device of the CPU-mounted unit 3 by output refresh. Similarly, the device of the CPU-mounted unit 3 is changed to the device value stored in the device of the expansion unit 4 by input refresh. As a result, the device of the CPU-mounted unit 3 and the device of the expansion unit 4 are synchronized with each other by input/output refresh.

It should be noted that another manner may be used which can exchange device values between units to update the device values (unit-to-unit synchronization) other than the refresh timing. However, the CPU-mounted unit 3 rewrites the device of the CPU-mounted unit 3 at any time, while the expansion units 4 rewrite the devices of the expansion units 4 at any time. That is, the device of the CPU-mounted unit 3 is accessible at any time by the internal elements of the CPU-mounted unit 3. Similarly, the devices of the expansion units 4 are accessible at any time by the internal elements of the expansion units 4. Device values are basically exchanged in the refresh between the CPU-mounted unit 3 and the expansion units 4 to update the device values so that the CPU-mounted unit 3 and the expansion units 4 can be synchronized with each other. In the program execution 202, the CPU-mounted unit 3 executes the program (computing) by using the updated input data. As shown in FIG. 6, in the program execution 202, a plurality of program modules or ladder programs can be executed based on the project data. The CPU-mounted unit 3 computes data by executing the programs. The END processing refers to general processing relating to peripheral servicing such as data communication with external equipment e.g., display (not shown) connected to the PC 2 or the CPU-mounted unit 3, and system error checking.

As discussed above, the PC 2 creates the ladder program through to user's operation, and transmits the created ladder program to the PLC 1. The input/output refresh, the ladder program execution, and the END processing form one cycle (one scan). The PLC 1 periodically executes this cycle, in other words, repeatedly executes this cycle in a cyclic manner. This periodic scan execution can control various types of output equipment (motors etc.) based on timing signals from various types of input equipment (sensors etc.).

In addition, the CPU-mounted unit 3 and the expansion units 4 have an internal-control cycle in addition to the scan cycle. The CPU-mounted unit 3 and the expansion units 4 control the functions of field devices 10 and the like with reference to the internal-control cycle.

<Logging>

Device values which were acquired when the PLC 1 executed the user program often help users to improve or correct the user program. To this end, the PLC 1 acquires device values that are previously specified, and creates log data. Here, devices which are managed by the PLC 1 include not only devices that are used by the user program but also devices that are not used by the user program. Also, some devices can help users to improve or correct the user program, while other devices may not be helpful. Generally, thousands of devices are managed by PLCs. Accordingly, selection of necessary devices is a burden to users. For this reason, the PC 2 analyzes the user program, and extracts devices that are used by or described in the user program as logging subjects. As a result, user's burden can be reduced.

If all the devices which are managed by the PLC 1 are extracted as logging subjects, scan time will be long. The reason is that logging is performed as one of the user programs or is performed in the input/output refresh. There may be cases where delay caused by logging disturbs users' desired operation of user program. Therefore, it is necessary to properly restrict the number of devices to be extracted as logging subjects.

The user program includes a plurality of program parts (e.g., program modules (main and sub ladder programs), function blocks). It may be sufficient for users to selectively log devices relating to program parts that are intended to be corrected by users from the plurality of program parts. Also, users may desire to withdraw specific program parts from the subjects to be extracted, or add other specific program parts to the subjects to be extracted. Therefore, it may be convenient for users to select one or more program parts so as to add or withdraw devices relating to the selected program parts to/from the logging subjects.

Figure 31:
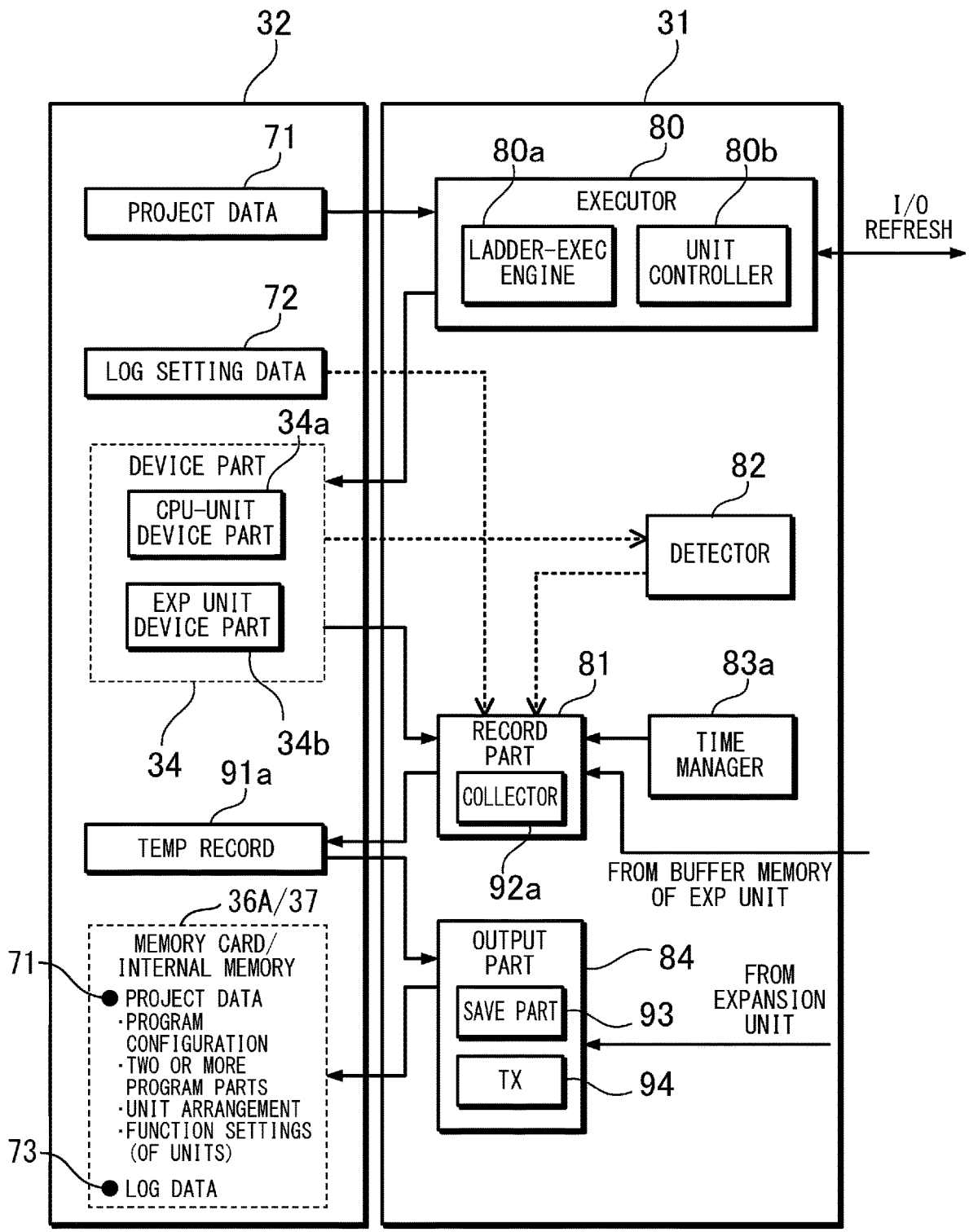
FIG. 31 is a diagram illustrating the functions of a CPU of the CPU-mounted unit.

FIG. 31 is a detailed functional block diagram showing the PLC-side CPU 31 of the CPU-mounted unit 3. The components same as the aforementioned components are attached with the same reference signs, and their description is omitted. The PLC-side CPU 31 will be described to store project data 71 and log setting data 72 which are received from the PC 2 in the PLC-side storage device 32. The device portion 34 of the PLC-side storage device 32 includes a CPU-mounted-unit device portion 34*a* and an expansion unit device portion 34*b*.

The PLC-side CPU 31 shown in FIG. 31 includes an execution portion 80, a detection portion 82, a recording portion 81, a time manager 83*a*, and an output portion 84. The detection portion 82 detects device-value rewriting operation of external equipment into any of devices included in the device portion 34. When the user program execution is terminated, or when a predetermined output condition is satisfied such as when a save-trigger relay for the memory card is turned ON, the output portion 84 writes the project data 71, the log data 73, and image data into the memory card 36A or the internal memory 37. The log data 73 is sequentially recorded in a memory (e.g., ring buffer) until the predetermined output condition is satisfied. If the capacity of the memory becomes full, the oldest log data item 73 will be erased so that a new log data item 73 is additionally recorded into the memory (log data is recorded in so-called FIFO manner). The memory card 36A can be removed from the CPU-mounted unit 3, and mounted to a mount portion of the PC 2. Accordingly, the log data 73 can be displayed on the display portion 7 of the PC 2. The output portion 84 can transmit the log data 73 to the PC 2, Cloud, and the like through the PLC-side communication portion 33.

The execution portion 80 of the PLC-side CPU 31 includes a ladder execution engine 80*a* which repeatedly executes the user program, and a unit control portion 80*b* which controls the ladder execution engine 80*a* and performs input/output refresh between the PLC-side CPU 31 and the expansion unit 4. The ladder execution engine 80*a* of the execution portion 80 repeatedly executes the user program included in the project data 71 whereby controlling the expansion unit 4 based on the user program. The ladder execution engine 80*a* of the execution portion 80 writes device values into output-type devices which will be held in the CPU-mounted-unit device portion 34*a* of the device portion 34, and reads device values from input-type devices which are held in the CPU-mounted-unit device portion 34*a* based on the user program.

In the PLC-side CPU 31, the recording portion 81 includes a collection portion 92*a*. The collection portion 92*a* reads device value that is designated by the log setting data 72 from the device values that are held in the device portion 34 from the device portion, and acquires time information from the time manager 83*a* if predetermined collection start conditions are satisfied. The collection portion 92*a* stores the device value and its corresponding time information which are associated with each other in the temporary recording portion 91*a*. The collection portion 92*a* acquires the device values and their corresponding time information, and stores them into the temporary recording portion 91*a* at every collection cycle (e.g., scanning cycle) which is designated by the log setting data 72. A ring buffer is suitably used as the temporary recording portion 91*a*. The reason to use a ring buffer is that all the data stored in the ring buffer is not saved as the log data 73 into the memory card 36A. For example, if predetermined save conditions are satisfied, a saving portion 93 can read a device value and time information from the temporary recording portion 91*a* constructed of a ring buffer, and can create the log data 73. The saving portion 93 can save the created log data 73 into the memory card 36A. Also, if predetermined save conditions are satisfied, the saving portion 93 may read mass data and time information from the expansion unit 4, and can create and save the log data 73 into the memory card 36A. The saving portion 93 saves the aforementioned device values and time information, and the aforementioned mass data and time information correlated with each other (in a correlated manner). Here, the "correlated manner" saving refers to saving which allows easy reproduction in the PC 2, and may be file management which correlates a number of files with each other for example. Specifically, in the case where first and second subfolders which stores device values and their time information, and mass data and its time information respectively are placed under a specific folder in the memory card 36A, a path to the specific folder (directory path) serves as a common flag, and files in the first and second subfolders can be saved in the "correlated manner" by using the common flag. In the case where another folder is placed on the same level (directory) as the aforementioned specific folder, the another folder means data package which is saved at another instant (different timing). Needless to say, similar subfolders can be placed under this another folder. Accordingly, the saving portion 93 can store the aforementioned device values and time information, and the aforementioned data (mass data) and time information in a number of files identified by the common flag (predetermined directory path), and save the files. Also, a filename may be used as the common flag, and the device values and their time information, and the data and its time information may be saved in the "correlated manner" by creating their files which have the common filename or correlated filenames, for example. In addition, the device values and the data may be correlated with each other by using time information of the device values and the data (mass data) as keys, and be listed and then stored in a single file. In this case, the device values and their time information, and the data and its time information may be saved in the "correlated manner". Needless to say, although the mass data is conceived as an example of data from monitoring equipment in this embodiment, the data from monitoring equipment can be continuous data such as motion data, communication data, and audio data. A transmission portion 94 may transmit the log data 73 to the PC 2, Cloud, and the like. If the temporary recording portion 91a constructed of a ring buffer becomes full, the collection portion 92a overwrites the oldest information which has been held in the ring buffer with the latest information. Although a ring buffer is used as an example of buffer for the temporary recording portion 91a, this is only illustrative. FIFO type buffers will work well as a buffer for the temporary recording portion 91a.

As discussed above, the CPU-mounted unit 3 and the expansion unit 4 have one or more functions. Various types of devices are assigned to the functions. Therefore, it may be convenient for users to select one or more functions so as to add or withdraw devices assigned to the selected functions to/from the logging subjects. For example, if an undesirable event occurs which relates to the communication function of the CPU-mounted unit 3, users can easily solve the undesirable event by referencing device values of the devices relating to the communication function of the CPU-mounted unit 3.

(Camera Input Expansion Unit 4c)

Figure 7:
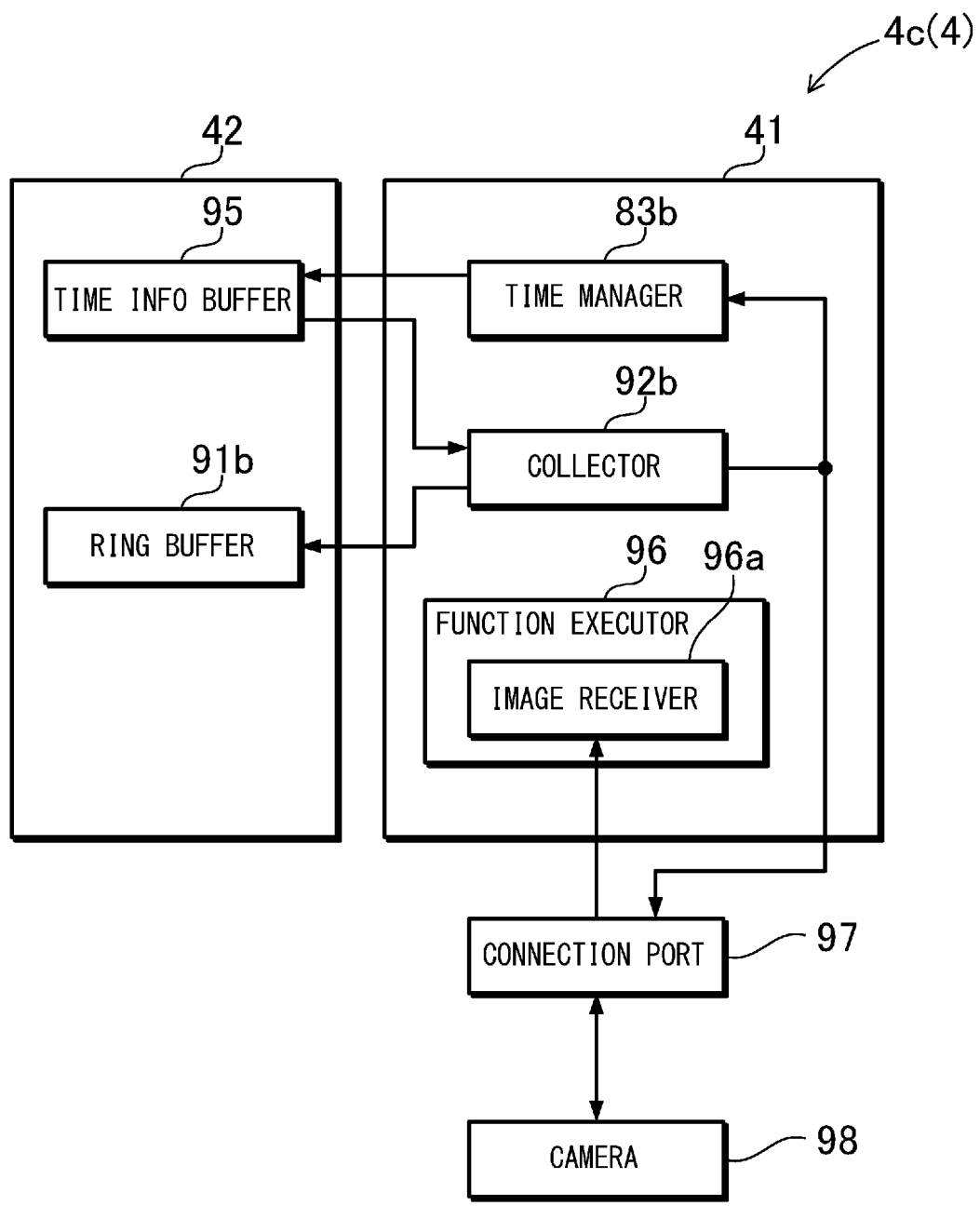
FIG. 7 is a diagram illustrating the functions of a CPU of an expansion unit.

FIG. 7 is a diagram illustrating the function of the CPU 41 of the camera input expansion unit 4c which is one of the expansion units 4 having a camera input function. The clock of the time manager 83b is synchronized with the clock of the time manager 83a of the CPU-mounted unit 3 shown in FIG. 31. For example, the time manager 83a of the CPU-mounted unit 3 transmits time information to the time manager 83b in the END processing. The time manager 83b synchronizes the clock of the time manager 83b with the clock of the time manager 83a of the CPU-mounted unit 3 based on the received time information. The clock may be realized by a counter which counts time based on the time information. For example, the collection portion 92b will periodically provide a trigger signal if a predetermined collection condition is satisfied (e.g., a predetermined relay device is turned ON). The time manager 83b acquires, from the clock, the time information corresponding to the instant when receiving the trigger signal, and stores it into a time-information buffer 95. The memory 42 includes the time-information buffer 95 and the temporary recording portion 91a. A connection port 97 is provided which is an interface for connecting the camera 98 to the expansion unit 4. The connection port 97 periodically provides the trigger signal which is sent from the collection portion 92b to the camera 98, or provides an image reception portion 96a with image data that is provided by the camera 98. The image data is an example of mass data. The connection port 97 is an example of a second external interface which is connected to monitoring equipment such as the camera 98 and is provided with data (image data) from the monitoring equipment. The image reception portion 96a is the whole or a part of a function-execution portion 96 which performs image capture function which includes reception of the image data from the camera 98 via the connection port 97. In this embodiment, the function-execution portion 96 (image reception portion 96a) controls the camera 98 based on imaging parameters such as exposure time, gain, white balance, and contrast (examples of setting information). These imaging parameters are specified by providing desired parameter values in the PC 2, and are transmitted to the function-execution portion 96 through the PLC-side communication portion 33 and the PLC-side CPU 31 of the CPU-mounted unit 3 shown in FIG. 5. From this viewpoint, the PLC-side communication portion 33 shown in FIG. 5 is an example of a first external interface which receives the setting information from external setting equipment such as the PC 2 and a display. In addition, the PLC-side communication portion 33 as the first external interface receives the user program created in the PC 2 as discussed above. The camera 98 captures an image based on the trigger signal, and provides image data corresponding to the captured image. The image reception portion 96a transfers the image data to the collection portion 92b. The collection portion 92b associates the time information that is held in the time-information buffer 95 and the image data that is provided from the image reception portion 96a with each other, and stores the associated time information and image data into the ring buffer 91b. If the ring buffer 91b becomes full, the collection portion 92b overwrites the oldest information which has been held in the ring buffer 91b with the latest information. Although the collection portion 92b automatically and periodically provides an image-capture trigger signal to the camera 98 in this embodiment, the present invention is not limited to this. The collection portion 92b may provide the image-capture trigger signal to the camera 98 based on the instruction from the user program, for example.

The CPU-mounted unit 3 communicates with the expansion units 4 by using one of the refresh communication performed in every scan, direct communication that can be performed at any time, and message communication performed by best effort at the time of occurrence of an event. For example, the saving portion reads the image data and its corresponding time information from the ring buffer 91b of the expansion unit 4 by using the direct communication, and adds these image data and time information to the log data 73. A plurality of direct communications with priority levels may be installed as the direct communication. In this case, the direct communication relating to the user program can have a relatively high priority level, while the direct communication relating to the logging can have a relatively low priority level. This priority assignment can reduce an influence of the logging on execution of the user program.

Figure 8:
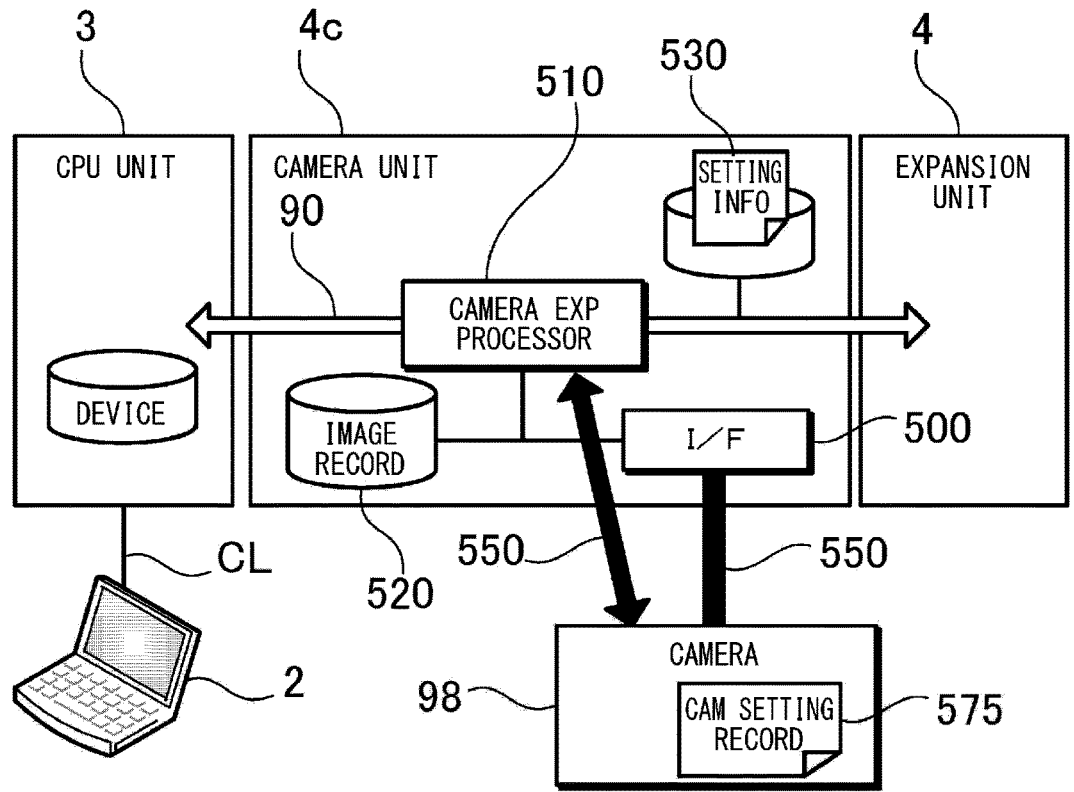
FIG. 8 is a conceptual illustration of the programmable-logic-controller system including a camera input expansion unit.

FIG. 8 is a functional block diagram of the programmable-logic-controller system which includes the camera input expansion unit 4c. In this illustrated programmable-logic-controller system, the PLC 1 is constructed of the CPU-mounted unit, the camera input expansion unit 4c, and another expansion unit 4. The CPU-mounted unit, the camera input expansion unit 4c, and the expansion unit 4 are connected via the unit-to-unit bus 90 to each other. The PC 2 is connected to the CPU-mounted unit via a communication line CL. The camera 98 is connected to the camera input expansion unit 4c via an image-capture-trigger line 501 shown in FIG. 10. The camera 98 includes a camera-setting recording portion 575. The CPU-mounted unit includes the device portion. Setting information on the camera 98 is recorded in the camera-setting recording portion 575.

Figure 9:
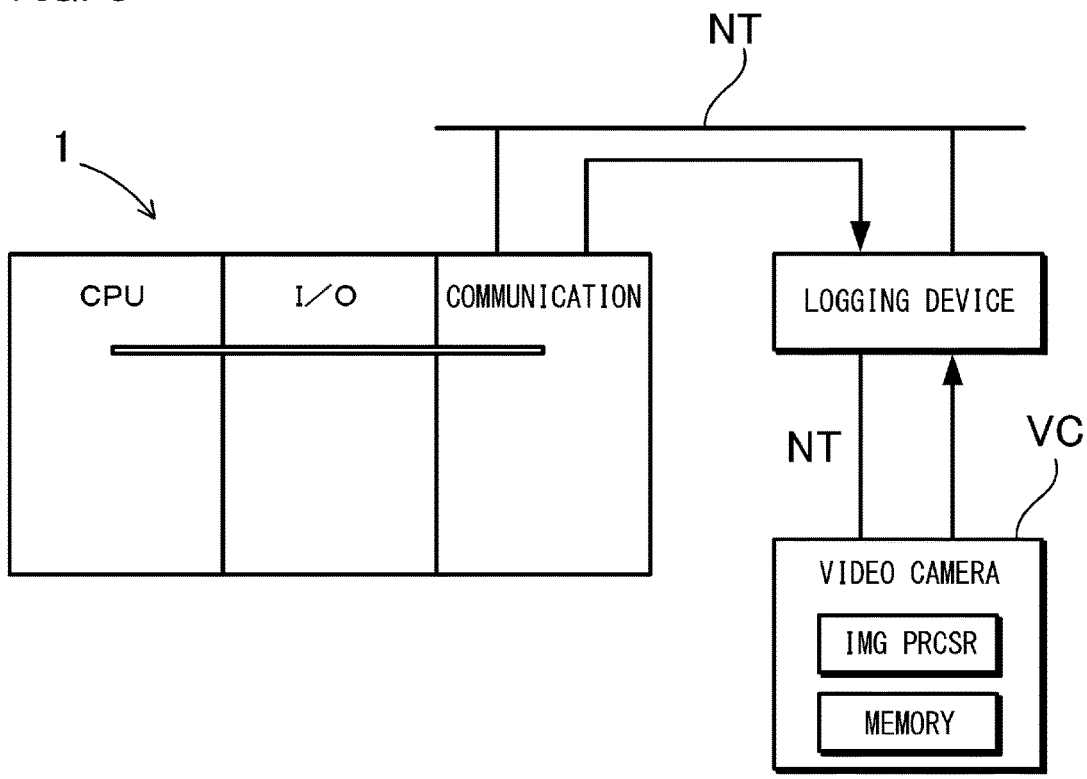
FIG. 9 is a schematic diagram showing a conventional programmable-logic-controller system to which a camera is connected.

A system is known which includes a PLC 1 and a video camera VC which are indirectly connected to each other through a communication network NT, and monitors production facilities by using camera images as shown in FIG. 9. In this system, if a facility trouble occurs, camera images before and after the trouble occurrence are analyzed to diagnose the cause of the trouble. However, if a time difference exists between the time of capture of device value in the PLC 1 and the time of capture of camera image, the diagnosis of the trouble will take time and manpower. For this reason, such a time difference is preferably kept as small as possible. On the other hand, in this known system, the both times cannot be easily synchronized with each other because of communication delay.

Figure 10:
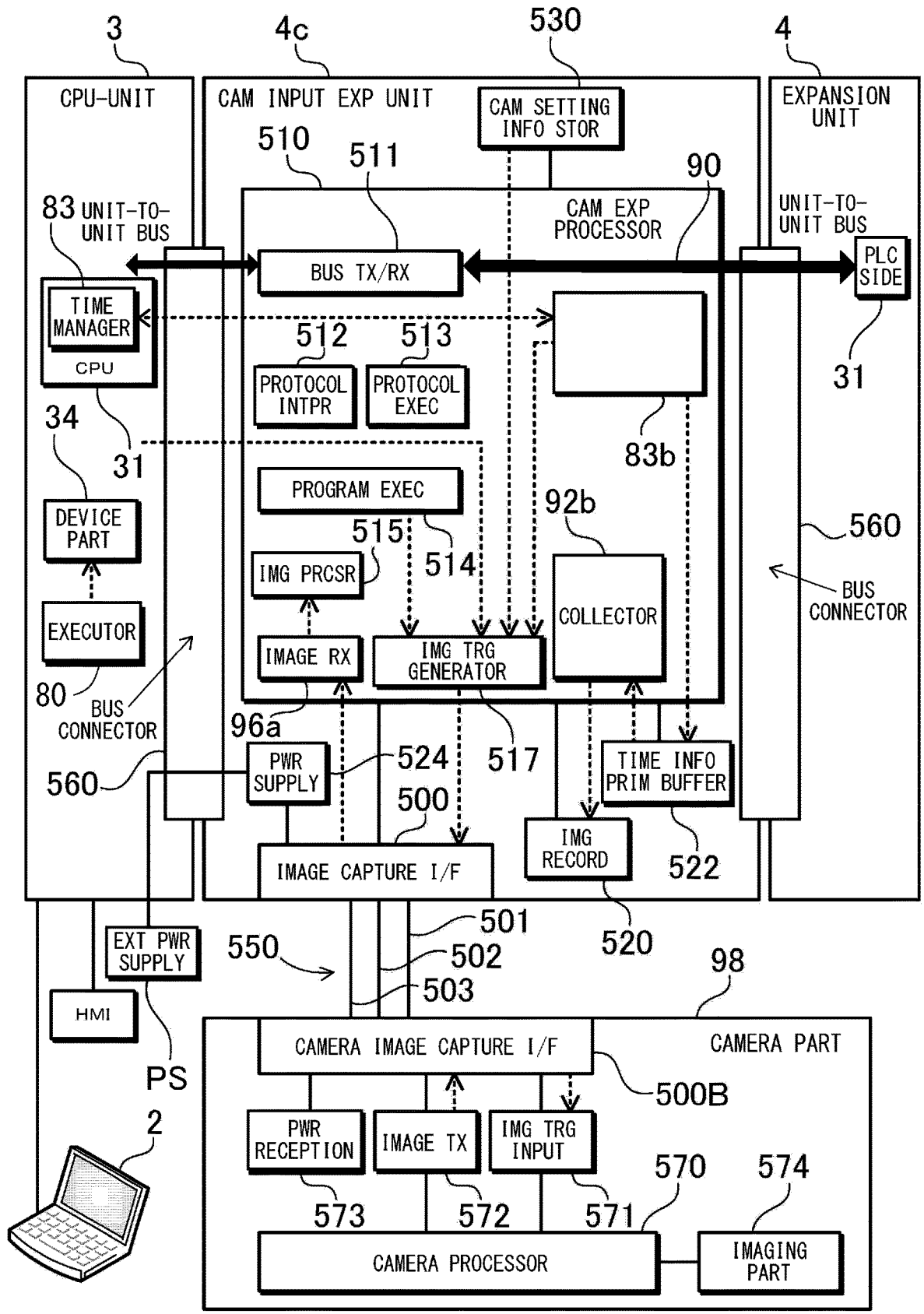
FIG. 10 is a functional block diagram showing the programmable-logic-controller system.

Contrary to this, the camera input expansion unit 4c shown in FIG. 8 is connected via the unit-to-unit bus 90 to the CPU-mounted unit 3 which is a basic unit. The image-capture-trigger line 501 and an image-communication line 502 shown in FIG. 10 are connected to an image-capture interface 500 which connects the camera 98 to the camera input expansion unit 4c. The synchronization timing in the unit-to-unit bus 90 can be extended even to the camera 98 by transmitting an ON/OFF signal which defines the image-capture trigger for the camera 98 via the image-capture-trigger line 501. As a result, the record time of a device value and the acquisition time of camera image data can be precisely synchronized with each other.

(Camera Input Expansion Unit 4c)

The camera input expansion unit 4c is electrically connected to the CPU-mounted unit via the unit-to-unit bus 90. The camera input expansion unit 4c is a unit for connection to the camera 98 which can capture an image of a predetermined area based on the image capture trigger from the programmable logic controller and generate image data corresponding to the captured predetermined area. The camera input expansion unit 4c shown in FIG. 8 includes the image-capture interface 500, a camera-setting-information storage portion 530, a camera expansion unit processor 510, and an image-recorder 520.

The camera-setting-information storage portion 530 stores the setting information on the camera 98 including the conditions of the image capture trigger. The setting information on the camera 98 which is stored in the camera-setting-information storage portion 530 includes the setting information that is created by the programming support device and received through the CPU-mounted unit 3. The user program which is executed by the CPU-mounted unit 3 is written in the programming support device which can be connected to the CPU-mounted unit 3.

The camera expansion unit processor 510 generates an ON/OFF signal for defining the image capture trigger based on the setting information of the camera 98, which is stored in the camera-setting-information storage portion 530. Based on the ON/OFF signal as the image capture trigger, the camera expansion unit processor 510 acquires the image data which is generated by the camera 98.

The image-recorder 520 records the image data which is acquired by the camera expansion unit processor 510. The image-recorder 520 records the image data which is acquired by the camera expansion unit processor 510 and the information on time of its corresponding image data acquisition which are associated with each other in chronological order. In addition, the image-recorder 520 provides the CPU-mounted unit 3 with the image data and the information on time of its corresponding image data acquisition based on instruction from the CPU-mounted unit 3.

The image-capture interface 500 is provided between the camera expansion unit processor 510 and the camera 98. The image-capture interface 500 has the image-capture-trigger line 501 and the image-communication line 502.

The image-capture-trigger line 501 is an interface propagating the camera 98 with the ON/OFF signal which is generated in the camera expansion unit processor 510 and defines the image capture trigger for triggering the camera 98 to capture an image. The image-capture-trigger line 501 is preferably a non-communication line. In this case, since the image capture trigger is provided not by communications but by I/O of ON/OFF, the image capture trigger can be provided at a very high speed as compared with transmission of an image capture command by communications.

The image communication line 502 and the image-capture-trigger line 501 are bundled together and form a camera connection cable 550 that connects the image-capture interface 500 and the camera 98 to each other. Accordingly, transmission/reception of all the electric signals for operating the camera 98 can be performed simply by connecting the camera input expansion unit 4c and the camera 98 to the image capture interface 500. As a result, wiring can be simple. Therefore, the structure of the programmable logic controller can be simplified.

The camera-setting-information storage portion 530 stores the setting information on the camera 98 which is received via the unit-to-unit bus 90 from the CPU-mounted unit 3. Examples of the setting information of the camera can be provided by various types of information such as framerate, image quality, rotation, exposure, gain, exposure time, white balance, contrast, gamma, sharpness, and an anti-flicker in a later-discussed GUI shown in FIG. 22. The camera expansion unit processor 510 is connected to the CPU-mounted unit 3 or the expansion unit 4 via the unit-to-unit bus 90. The camera expansion unit processor 510 receives image data from the camera 98 via the image-capture interface 500 based on the setting information on the camera 98 which is stored in the camera-setting-information storage portion 530. The image-recorder 520 collects the image data acquired by the camera 98, and records this image data and the information on time of the image data acquisition which are associated with each other. Accordingly, the programmable logic controller can obtain precise time synchronization with device records relating to the captured image data generated by the camera 98. In particular, since the ON/OFF signal is transferred through the dedicated image-capture trigger line 501 not through the communication line and without command interpretation, time delay can be avoided by such precise time synchronization.

(Detailed Block Diagram of Camera Input Expansion Unit 4c)

FIG. 10 is a detailed block diagram of the programmable-logic-controller system which includes the camera input expansion unit 4c and the camera 98 connected to the camera input expansion unit 4c. This illustrated programmable-logic-controller system includes the CPU-mounted unit 3, the camera input expansion unit 4c, the PLC 1 constructed of expansion units, the PC 2 connected to the PLC 1, a display HMI, and external power source PS. In addition, the camera 98 is connected to the camera input expansion unit 4c.

The expansion unit 4 includes a bus connector 560 and the PLC-side CPU 31. The bus connector 560 includes the unit-to-unit bus 90, and performs bus communication with the CPU-mounted unit 3 via the unit-to-unit bus 90 so that the PLC-side CPU 31 performs appropriate processing depending on the functions of the expansion units 4.

The PC 2 is connected to the CPU-mounted unit 3 and serves as a setting device by which various types of settings can be made. The display HMI (Human Machine Interface) can display image data captured by the camera 98 through the PLC 1, collected device values, setting information, and the like. A programmable display can be suitably used as the display HMI.

(Camera 98)

The camera 98 includes a camera-side image-capture interface 500B, a power reception portion 573, an image transmission portion 572, the image-capture-trigger input portion 571, a camera processing portion 570, and an image capture portion 574. The camera-side image-capture interface 500B of the camera 98 is connected to the image-capture interface 500 of the camera input expansion unit 4c via the camera connection cable 550 so that the camera 98 transmits/receives electric signals, image data, power supply, and the like to/from the camera input expansion unit 4c. The power reception portion 573 is supplied with power from a power supply portion 524 supplied via a power supply line 503, and serves as a power source of the camera 98 which supplies power for driving the camera 98 to the parts of the camera. The image-capture-trigger input portion 571 receives the image-capture trigger from an image-capture-trigger generator 517 via the image-capture-trigger line 501, and transmits the image-capture trigger to the camera processing portion 570. The camera processing portion 570 captures an image through the image capture portion 574 based on the image-capture trigger. The image capture portion 574 is constructed of an imaging element such as CMOS sensor, CCD sensor, or the like. The camera processing portion 570 receives the image data captured by the image capture portion 574 and transmits it to the image transmission portion 572. The image transmission portion 572 transmits the image data to the image reception portion of the camera input expansion unit 4c via the image-communication line 502.

The external power source PS supplies power to the PLC 1. The power supplied to the camera 98 is supplied via the power supply line 503 from the CPU-mounted unit 3. In the example shown in FIG. 10, the power is supplied to the camera 98 from the power supply portion 524 which is included in the camera input expansion unit 4c.

(Camera Input Expansion Unit 4c)

The camera input expansion unit 4c includes the camera expansion unit processor 510, the camera-setting-information storage portion 530, the image capture interface 500, the power supply portion 524, the image-recorder 520, a time-information primary buffer 522, and the bus connector 560.

The camera expansion unit processor 510 includes a bus transmission/reception portion 511, the protocol interpretation portion 512, a protocol-execution portion 513, the program-execution portion 514, an image-processing portion 515, the image reception portion 96a, the image-capture-trigger generator 517, the collection portion 92b, and the time manager 83b. This camera expansion unit processor 510 can be constructed of an FPGA, SoC, or the like.

The bus transmission/reception portion 511 performs bus communication with the CPU-mounted unit 3 and the expansion units 4 in accordance with a protocol, and transmits/receives commands. The protocol interpretation portion 512 interprets commands received by the bus transmission-reception portion 511. The protocol-execution portion 513 executes the commands which are interpreted by the protocol interpretation portion 512. For example, if a command for triggering the camera 98 to capture an image is transmitted from the CPU-mounted unit 3 to the camera input expansion unit 4c via the unit-to-unit bus 90, the bus transmission-reception portion 511 receives the command, and the protocol interpretation portion 512 interprets the command. Correspondingly, the protocol-execution portion 513 instructs the image-capture-trigger generator 517 to generate a camera-image-capture trigger. For example, the camera processing portion 570 of the camera 98 can be controlled by the image-capture trigger based on a ladder program by describing the image-capture trigger in the ladder program by users (as discussed in detail).

The image-capture-trigger generator 517 generates the ON/OFF signal to be provided to the camera 98 via the image-capture-trigger line 501.

The collection portion 92b associates the information on time of the generation of the ON/OFF signal with its corresponding image data which is acquired by the camera 98, and records the associated information on time and image data into the image-recorder 520.

The camera 98 is connected to the camera input expansion unit 4c via the image-capture-trigger line 501. The camera 98 includes a camera-setting recording portion 575. Setting information on the camera 98 is recorded in the camera-setting recording portion 575.

In the image-capture interface 500 which connects the camera input expansion unit 4c and the camera 98 to each other as shown in FIG. 10, the camera-side image-capture interface 500B includes a power supply interface in addition to the image-communication line 502 and the image-capture-trigger line 501. The power supply interface is an interface to supply power to the camera 98. In the camera connection cable 550 which connects the camera input expansion unit 4c and the camera 98 to each other via the image-capture interfaces 500 and 500B, the power supply line 503 connected to the power supply interface is additionally bundled together with the image-communication line 502 and the image-capture-trigger line 501. Accordingly, transmission/reception of all the electric signals (including power supply) for operating the camera 98 can be performed simply by connecting the camera input expansion unit 4c and the camera 98 to the image capture interface 500. As a result, wiring can be simple. Therefore, the structure of the programmable logic controller can be simplified. Also, the camera connection cable 550 includes a ground line. The ground line is connected, for example via a capacitor, to a shielding of a housing of the camera input expansion unit 4c.

(CPU-Mounted Unit 3)

The CPU-mounted unit 3 shown in FIG. 10 includes the bus connector 560, the PLC-side CPU 31 including the time manager 83, the device portion 34, and the execution portion 80. The execution portion 80 records device values together with their corresponding time information which is provided by the time manager 83 into the device portion 34. The time manager 83 can be used for the time synchronization. A counter can be used for the time manager 83.

The time information of the CPU-mounted unit 3 is transmitted to the camera input expansion unit 4c and other expansion units, and is also used for correction for time of these expansion units.

The program-execution portion 514 is the ladder-execution engine 80a which repeatedly executes the user program. The device portion 34 serves as a device portion or device memory which stores device values of a number of devices as storage areas to be referred by the program-execution portion based on the user program.

(Image-Capture-Trigger Generator 517)

The image-capture-trigger generator 517 generates the image capture trigger at regular intervals (based on timer recorded in the camera-setting-information storage portion 530), or based on the timing determined by the program-execution portion 514 (based on the program stored in the camera-setting-information storage portion 530) or the instruction from the CPU-mounted unit 3. At that time, the information on the time of this image-capture-trigger generator is recorded in the time-information primary buffer 522 by the time manager 83b. The camera 98 acquires image data when receiving the image capture trigger, and transmits the image data to the camera input expansion unit 4c. When receiving the image data, the image reception portion 96a of the camera input expansion unit 4c records the image data together with the time information in the time-information primary buffer 522 into the image-recorder 520.

The image capture trigger can be controlled by a ladder program by describing the image capture trigger in the ladder program. For example, the image-capture-trigger generator 517 generates the image capture trigger based on refresh communication in the case where a trigger instruction is generated in END processing, or the direct communication performed by an interrupt without waiting for the END processing. Furthermore, the ON/OFF signal for defining the image capture trigger may determine ON/OFF timing based on a timer, an external input, or abnormality detection.

(Camera-Setting-Information Storage Portion 530)

The PC 2 is connected to the CPU-mounted unit 3 and serves as a setting device by which various types of settings can be made. For example, function settings on the camera input expansion unit 4c are made from the PC 2. The setting information is stored in the camera-setting-information storage portion 530 of the camera input expansion unit 4c. The camera-setting-information storage portion 530 stores an image capture cycle in the case where images are periodically captured by the camera 98, a timer value, a program which is executed by the camera input expansion unit 4c, and the like. The camera input expansion unit 4c operates in accordance with the setting information on the camera 98 stored in the camera-setting-information storage portion 530.

(Power Supply Portion 524)

The power supply portion 524 supplies power to the camera 98 via the power supply line 503. This power is supplied from the external power source PS connected to the CPU-mounted unit 3.

(Time-Information Primary Buffer 522)

The time-information primary buffer 522 temporarily records information on time of image-capture-trigger from the time manager 83b of the camera input expansion unit 4c. Together with the time information in the time-information primary buffer 522, the image-recorder 520 temporarily records image data which is acquired by the camera 98 and received by the image reception portion 96a of the camera input expansion unit 4c. The time-information primary buffers 522 and the image-recorder 520 can be separately provided or be constructed of a single buffer memory. In the case of a single buffer memory, the address space of the single buffer memory can be divided into the time-information primary buffer and the image-recorder.

(Camera-Setting-Information Storage Portion 530)

The camera-setting-information storage portion 530 stores setting information which is received via the unit-to-unit bus 90 from the CPU-mounted unit 3.

(Camera Expansion Unit Processor 510)

The camera expansion unit processor 510 receives image data from the camera 98 via the image-capture interface 500 based on setting information which is stored in the camera-setting-information storage portion 530. Also, image data which is collected by the camera input expansion unit 4c can be monitored in the display HMI through the PLC 1. In addition, the camera expansion unit processor 510 has image-processing function. The camera expansion unit processor 510 additionally has protocol interpretation function of refresh data, and transmission function to other expansion units.

(Image-Recorder 520)

The image-recorder 520 is a component which temporarily records the image data acquired by the camera 98 and the information on time of this image data acquisition which are associated with each other. Here, the information on time can be the actual time of day, corrected time which is corrected for communication delay or the like, a counter value, or the like. For example, times of the CPU-mounted unit 3 and the camera input expansion unit 4c are synchronized with each other by using counters which are included in the CPU-mounted unit 3 and the camera input expansion unit 4c.

In the programmable-logic-controller system shown in FIG. 10, one camera input expansion unit 4C is connected to the CPU-mounted unit 3. However, the number of camera input expansion units in the present invention is not limited to one. Two or more camera input expansion units can be connected to the CPU-mounted unit 3. In this case, triggers such as image capture triggers for the cameras connected to the two or more camera input expansion units can be synchronized between these two or more camera input expansion units.

Although one camera 98 is connected to the camera input expansion unit 4c in the example of FIG. 10, two or more cameras may be connected to one camera input expansion unit. In this case, the camera input expansion unit includes two or more image-capture interfaces for connection to the cameras.

In the case where two or more cameras are connected the CPU-mounted unit, synchronized images of a common image capture subject can be captured from two or more directions, for example. Alternatively, images of a common image capture subject can be captured out of phase so that fps can be substantially increased.

(Sequence Diagram of Trigger Generation)

Figure 11:
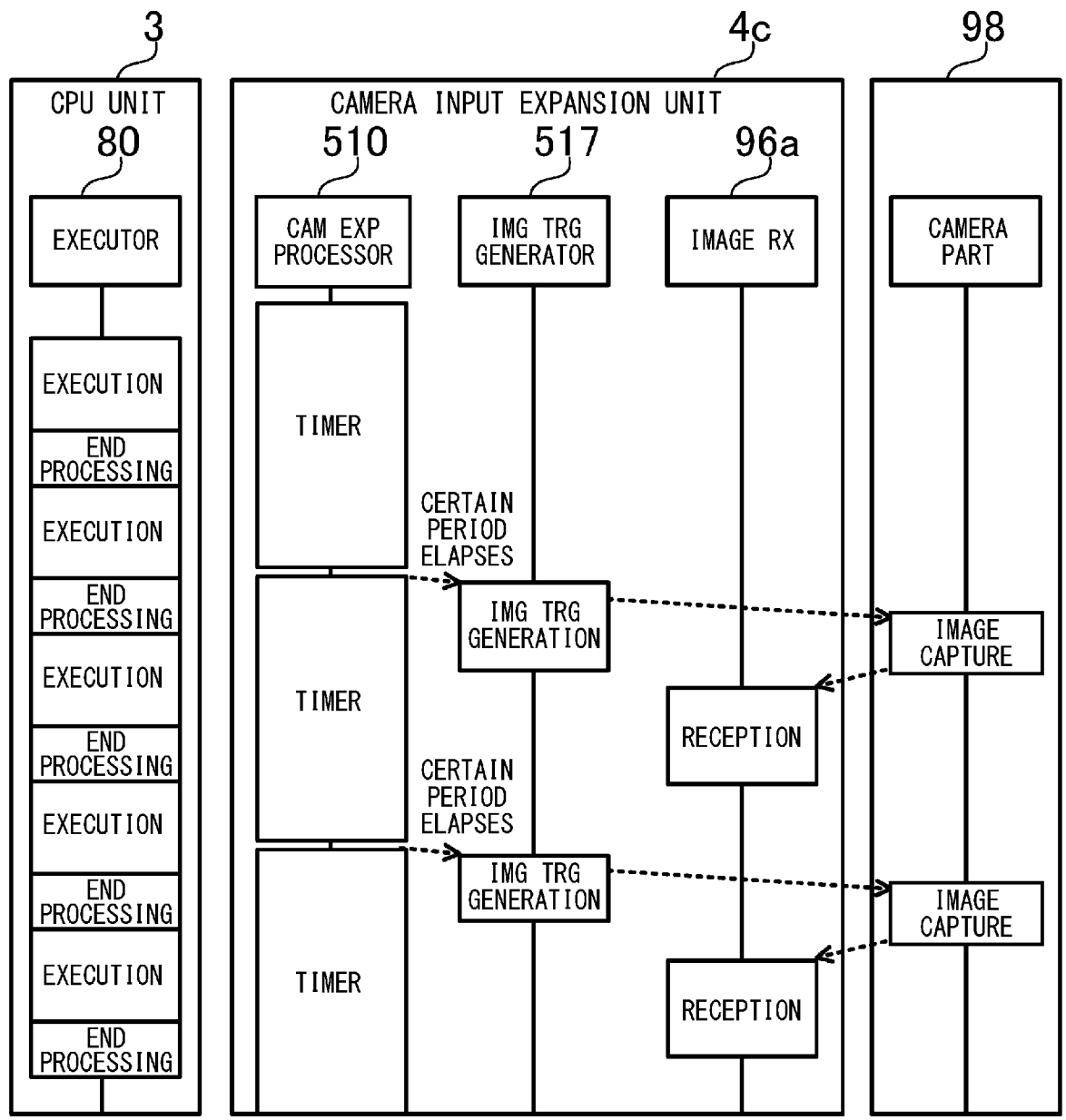
FIG. 11 is a sequence diagram showing generation of image capture triggers by the camera input expansion unit based on setting information.
Figure 12:
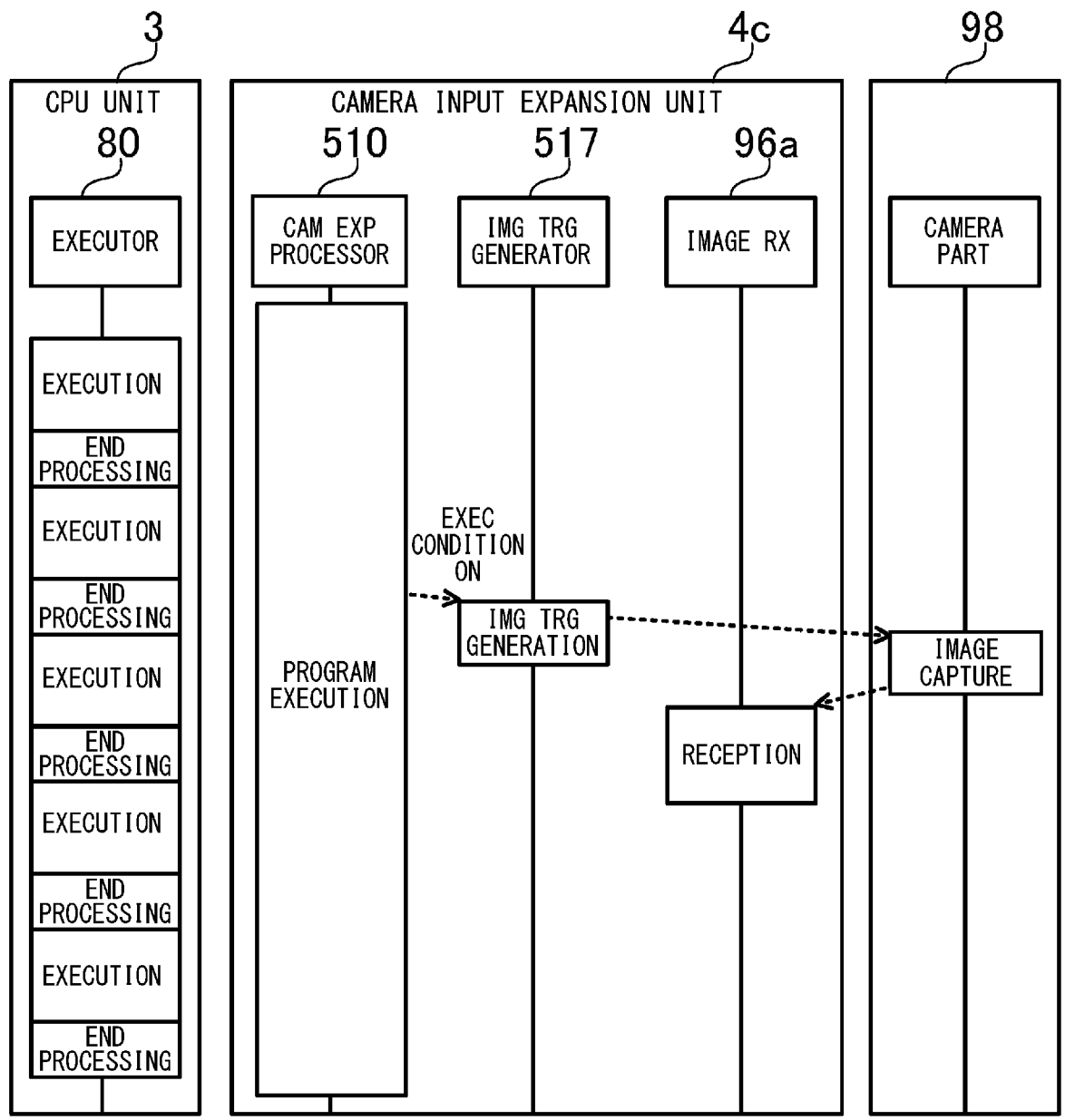
FIG. 12 is a sequence diagram showing generation of an image capture trigger by the camera input expansion unit based on a program.

FIGS. 11 and 12 are sequence diagrams of trigger generation. Examples of generating operation of an ON/OFF signal of trigger signal as the image capture trigger of the image-capture-trigger generator 517 can be provided by case (1) where the trigger signal is generated on the camera input expansion unit 4c side as a trigger source, and case (2) where the trigger signal is generated on the CPU-mounted-unit 3 side as a trigger source. The following description describes these cases.

(1) Trigger Source is Camera Input Expansion Unit 4c Side

The generating operation in the case where the trigger source is the camera input expansion unit 4c side is first described with reference to the sequence diagrams of FIGS. 11 and 12. In this case, two exemplary methods can be provided. In one method, the image capture trigger is generated at predetermined intervals based on setting information which is saved on the camera input expansion unit 4c side. In another method, the image capture trigger can be generated at an arbitrary instant based on the program on the camera input expansion unit 4c side. The method in which the image capture trigger is generated at predetermined intervals based on setting information which is saved on the camera input expansion unit 4c side is now described with reference to the sequence diagram of FIG. 11. In this method, the image-capture-trigger generator 517 of the camera input expansion unit 4c generates the image capture trigger asynchronous to the CPU-mounted unit 3. That is, the execution portion 80 (e.g., ladder execution portion) repeatedly executes a program (e.g., ladder program) and END processing in the CPU-mounted unit 3, while the image-capture-trigger generator 517 generates an image capture trigger in the camera input expansion unit 4c every after a predetermined period of time elapses based on a timer, for example. The timer can be realized by the time manager 83b of the camera expansion unit processor 510. Alternatively, a timer IC or the like may be additionally provided. The camera 98 captures an image based on the image capture trigger, and the image reception portion 96a of the camera input expansion unit 4c receives the acquired image data.

The method in which the trigger is generated at an arbitrary instant based on the program on the camera input expansion unit 4c side is now described with reference to the sequence diagram of FIG. 12. Also, in this method, the image-capture-trigger generator 517 of the camera input expansion unit 4c generates the image capture trigger asynchronous to the repetitive operation of program execution and END processing by the program-execution portion of the CPU-mounted unit 3. The program-execution portion 514 which is included in the camera expansion unit processor 510 of the camera input expansion unit 4c executes the program. If execution conditions are satisfied (ON), the image-capture-trigger generator 517 generates an image capture trigger based on the conditions. Based on the image capture trigger, the camera 98 captures an image, and the image reception portion 96a receives the acquired image data.

(2) Trigger Source is CPU-Mounted-Unit 3 Side

Figure 13:
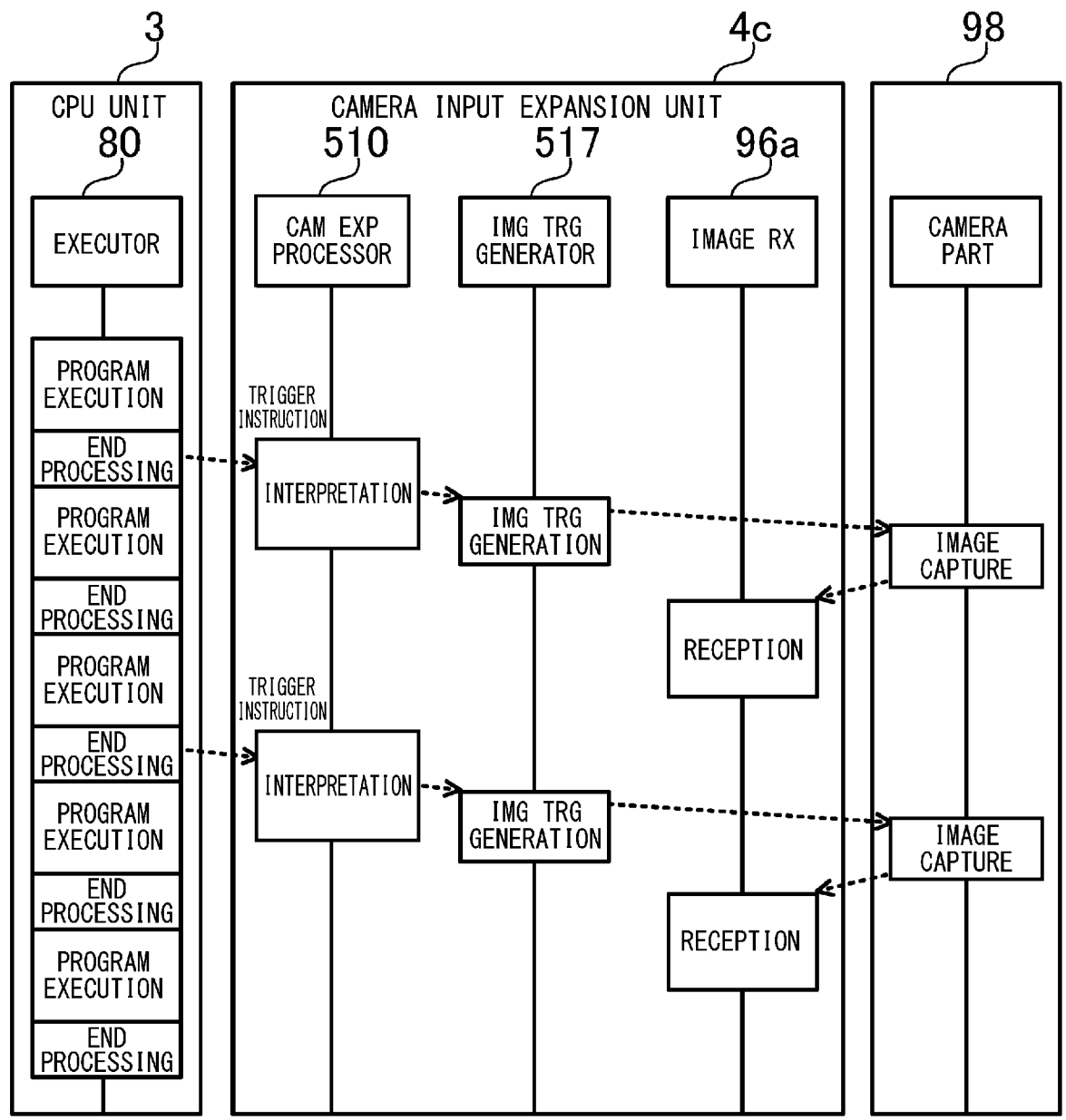
FIG. 13 is a sequence diagram showing generation of image capture triggers by the CPU-mounted unit in response to end processing.
Figure 14:
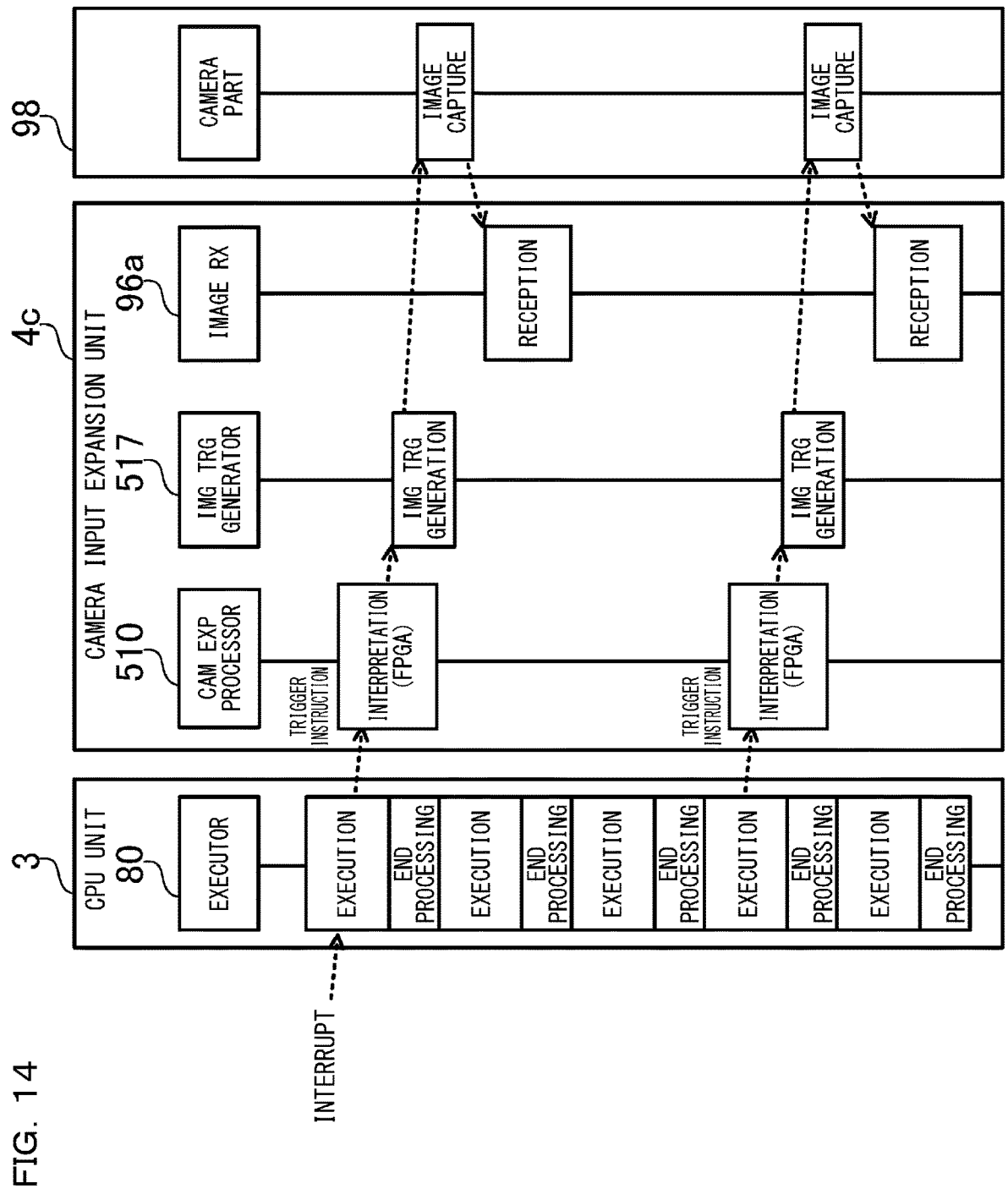
FIG. 14 is a sequence diagram showing generation of image capture triggers by the CPU-mounted unit when an interrupt occurs.

The generating operation in the case where the trigger source is the CPU-mounted-unit 3 side is now described with reference to the sequence diagrams of FIGS. 13 and 14. In this case, two exemplary methods can be provided. In one method, a trigger instruction is generated in END processing. In another method, a trigger instruction is generated when an interrupt occurs during program execution. The method in which a trigger instruction is generated in END processing is first described with reference to FIG. 13. In this method, the trigger instruction is generated based on refresh communication which is performed in the program execution. The refresh communication is the same as the unit-to-unit communication (input/output refresh) shown in FIG. 6. Also in FIG. 13, the program-execution portion repeats the program execution and the END processing in the CPU-mounted unit 3. A trigger instruction is generated between program execution operations, for example, in END processing. The camera expansion unit processor 510 of the camera input expansion unit 4c interprets this trigger instruction so that the image-capture-trigger generator 517 generates an image capture trigger. Based on the image capture trigger, the camera 98 captures an image, and the image reception portion 96a receives the acquired image data.

The method in which a trigger instruction is generated when an interrupt occurs during program execution is now described with reference to FIG. 14. In this method, trigger instruction can be generated during program execution by using direct communication without waiting for END processing in the CPU-mounted unit 3, in other words, without waiting for unit-to-unit communication (refresh communication). In this method, the camera processing portion 570 can be controlled by the image capture trigger which is controlled by a ladder program by describing the image capture trigger in the ladder program. Specifically, while the program-execution portion repeats program execution such as ladder program and the END processing in the CPU-mounted unit 3, if an interrupt occurs during the program execution, a trigger instruction is generated. Examples of interrupt can be provided by an interrupt from other expansion units, an interrupt from communication, a fixed cycle interrupt, and the like. When the camera input expansion unit 4c receives the trigger instruction, the camera expansion unit processor 510 of the camera input expansion unit 4c interprets this trigger instruction so that the image-capture-trigger generator 517 generates an image capture trigger. Based on the image capture trigger, the camera 98 captures an image, and the image reception portion 96a receives the acquired image data.

Figure 15:
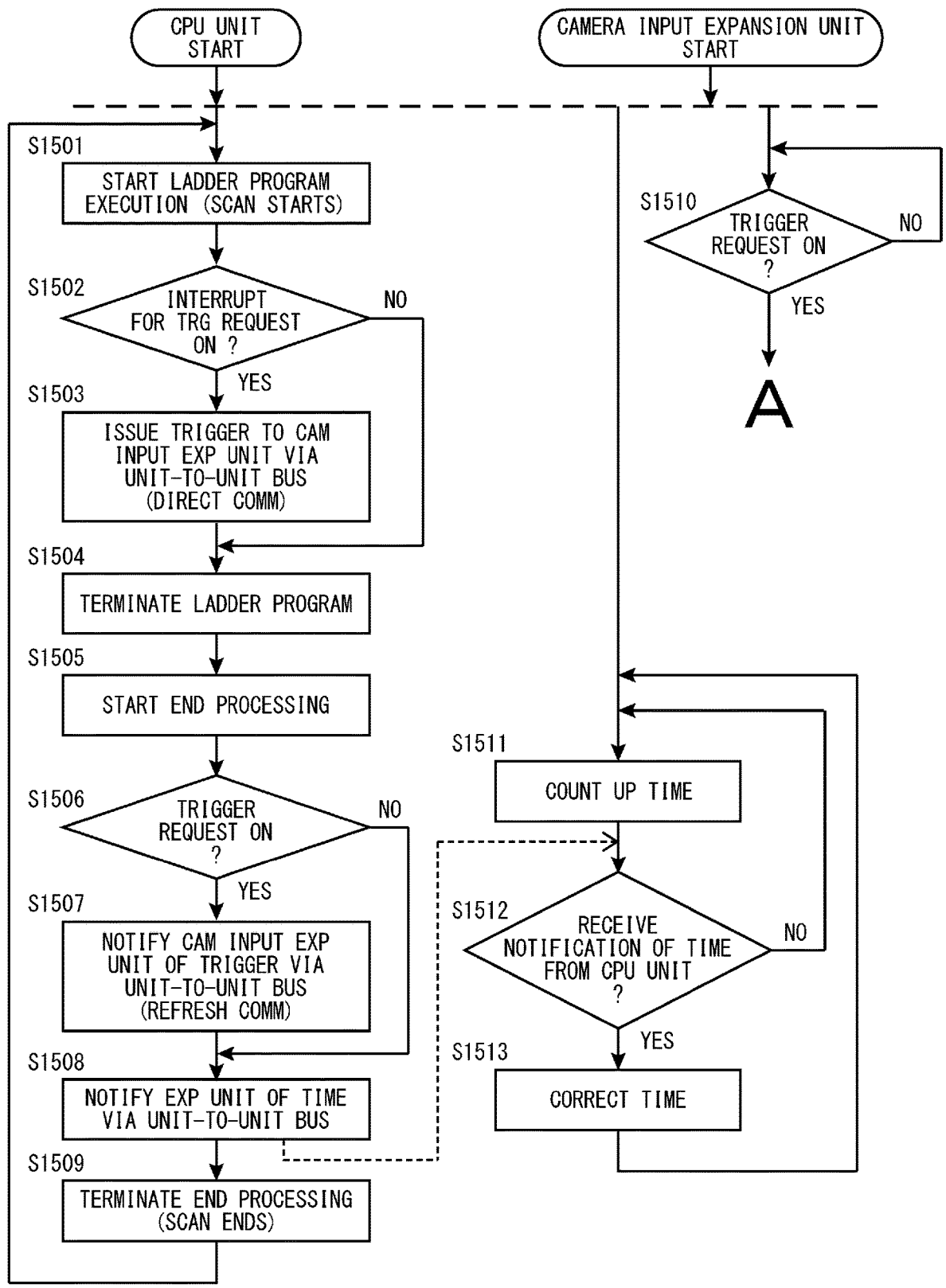
FIG. 15 is a flow diagram showing procedure relating to generation of the image capture trigger.

The above generating operations of image capture trigger are described as a single procedure with reference to a flowchart of FIG. 15. Initially, a scan starts on the CPU-mounted-unit 3 side in step S1501. Here, execution of a program such as ladder program is started. Subsequently, in step S1502, it is determined whether an interrupt for trigger request occurs. This step corresponds to the operation in FIG. 14. If no interrupt occurs, the procedure jumps to step S1504 so that this program execution is terminated. If an interrupt occurs, a trigger is generated to the camera input expansion unit 4c via the unit-to-unit bus 90 in step S1503. That is, a trigger instruction is generated to the camera input expansion unit 4c by using direct communication without waiting for refresh communication. Then, ladder program execution is terminated in step S1504, and END processing starts in step S1505.

Subsequently, it is determined whether a trigger request occurs in step S1506. This step corresponds to the operation in FIG. 13. If no trigger request occurs, the procedure jumps to step S1508. If a trigger request occurs, notification of the trigger is provided to the camera input expansion unit 4c via the unit-to-unit bus 90 in step S1507. That is, refresh communication is performed. Subsequently, notification of time is provided to the camera input expansion unit 4c via the unit-to-unit bus 90 in step S1508. Subsequently, END processing is terminated in step S1509. One scan is thus completed, and the procedure returns to step S1501, and starts the next scan.

On the other hand, the procedure in the camera input expansion unit 4c starts with S1510 where it is determined whether a trigger request occurs. If a trigger request occurs, a procedure A shown in FIG. 16 (discussed later in detail) is performed. If no trigger request occurs, the procedure returns to step S1510 and repeats this step. That is, the procedure is in a standby status for a trigger request. This trigger request may be turned ON based on internal settings of the camera input expansion unit 4c (FIGS. 11 and 12), and may also be turned ON based on an instruction from the CPU-mounted unit 3 (FIGS. 13 and 14).

In addition, another routine runs in the camera input expansion unit 4c. Time is counted up in step S1511. Subsequently, it is determined whether notification of time is provided from the CPU-mounted unit 3 in step S1512. If not, the procedure returns to step S1511 and repeats this routine. If notification of time is provided, time is corrected in step S1513. As a result, the time in the camera input expansion unit 4c can be corrected at regular intervals based on the time in the CPU-mounted unit 3. Therefore, the difference can be minimized between the device record time of the CPU-mounted unit 3 and the trigger generation time of the camera input expansion unit 4*c*.

Figure 16:
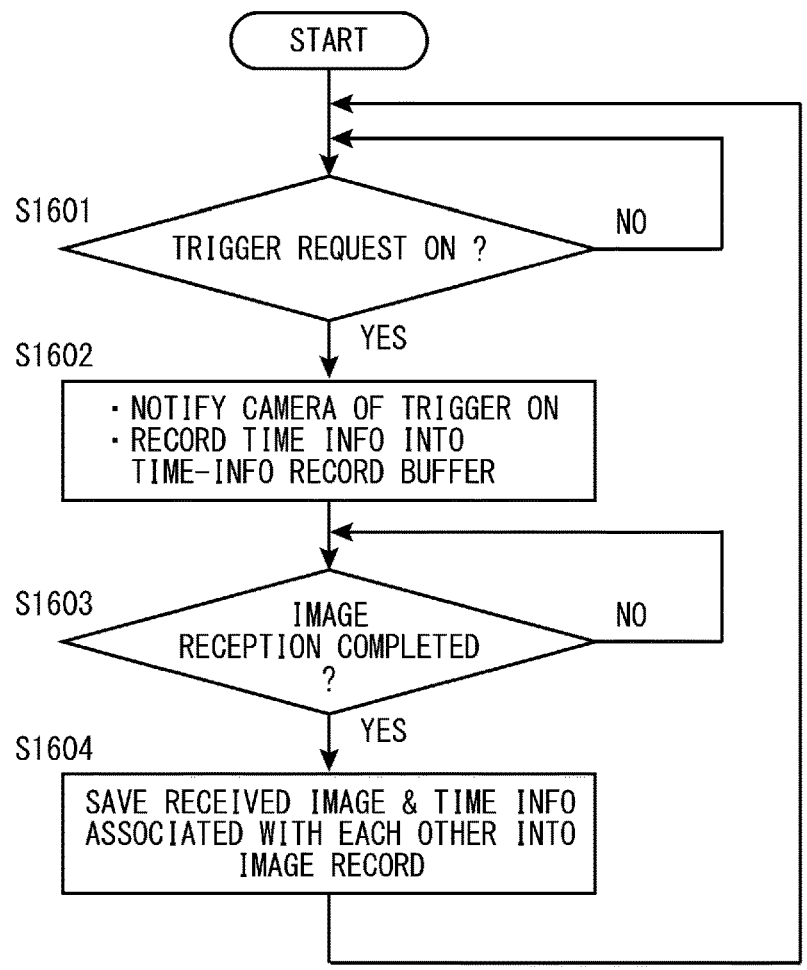
FIG. 16 is a flowchart showing procedure of the camera input expansion unit.

The procedure A which is executed if a trigger request occurs in step S1510 is now described with reference to FIG. 16. It is first determined whether a trigger request occurs in step S1601 (step S1510 in FIG. 15). If no trigger request occurs, the procedure returns to step S1601 and repeats this step. That is, the procedure is in a standby status for a trigger request. If a trigger request occurs, the procedure goes to step S1602 so that the camera 98 is notified of trigger ON, and the time information is recorded into the time-information record buffer. Subsequently, in step S1603, it is determined whether reception operation of the image data is completed. If not, the procedure returns to step S1603, and is in a standby status for the completion. If reception operation of the image data is completed, the procedure goes to step S1604 so that the received image and its corresponding time information are associated and saved in the image-recorder 520. Subsequently, the procedure returns to step S1601 and repeats this procedure.

(Arrangement of Camera Input Expansion Unit 4*c*)

Figure 17:
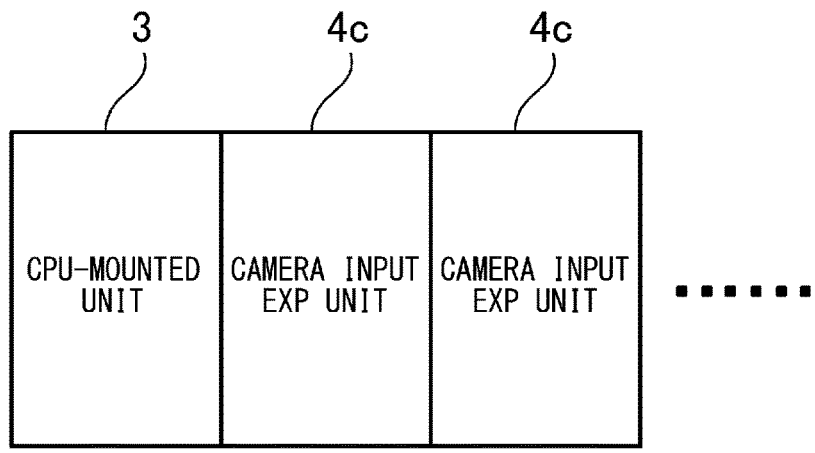
FIG. 17 is a schematic diagram showing the connection between the camera input expansion units and the CPU-mounted unit according to an embodiment.

The following description describes the arrangement of the camera input expansion unit 4*c*. Two or more camera input expansion units 4*c* can be connected in series to one CPU-mounted unit 3, which is a basic unit, as shown in FIG. 17. Other types of expansion units can be connected to the CPU-mounted unit in addition to the camera input expansion unit. These expansion units 4 may be connected to each other in any arrangement.

Figure 18:
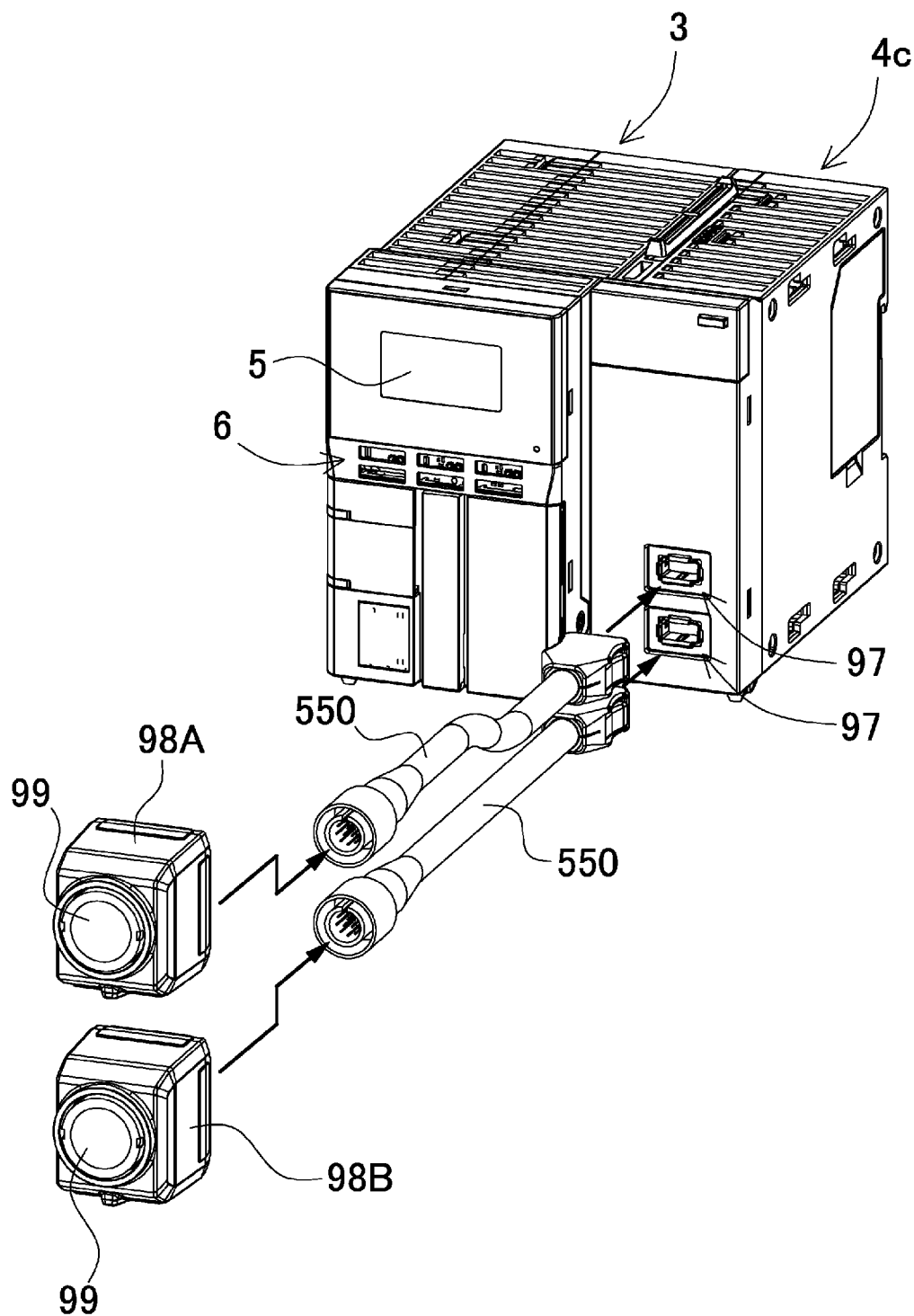
FIG. 18 is a perspective view showing the appearance of the camera input expansion unit and cameras connected to the unit.
Figure 19:
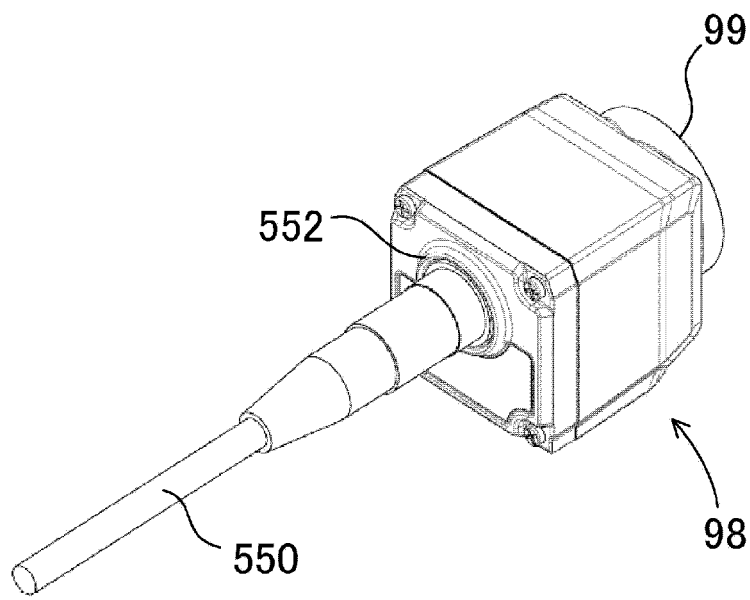
FIG. 19 is a back view of the camera shown in FIG. 18.
Figure 20:
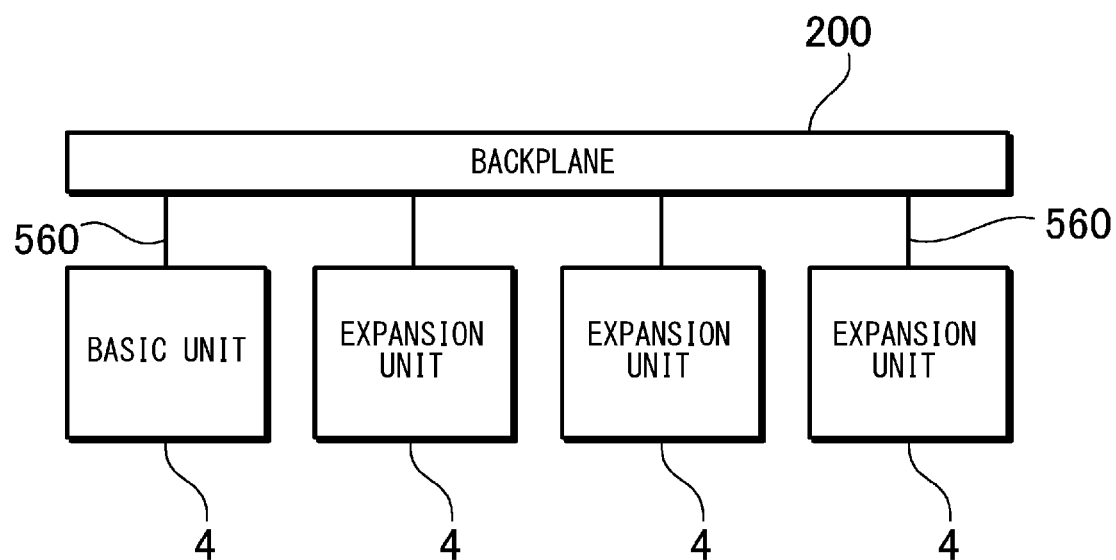
FIG. 20 is a schematic diagram showing the connection between a backplane and units.

FIG. 18 is a perspective view showing the appearance of the CPU-mounted unit 3 and the camera input expansion unit 4*c*. FIG. 19 is a perspective view showing the appearance the camera 98 as viewed from the back surface side. In the example of FIG. 18, the CPU-mounted unit 3 and the camera input expansion unit 4*c* are arranged side by side. The CPU-mounted unit 3 and the camera input expansion unit 4*c* are connected through the bus connector 560 to each other. The bus connectors 560 can be arranged on the boundary surfaces of the CPU-mounted unit 3 and the camera input expansion unit 4*c* to be coupled to each other. Alternatively, the bus connector may be arranged on the back or bottom surface side. In the case where the bus connector is arranged on the back surface side or the like, a backplane 200 is provided between the units, as shown in FIG. 20.

(Backplane 200)

A backplane can be used for connection between two or more units. FIG. 20 is a schematic diagram showing an example of backplane. This illustrated backplane 200 includes two or more bus connectors 560 which are spaced at a fixed interval away from each other. The CPU-mounted unit 3 and the expansion unit 4 can be removably inserted to the bus connectors 560. Accordingly, the units can be connected to each other via the bus connector 560 of the backplane 200.

The CPU-mounted unit 3 shown in FIG. 18 has a box-shaped housing. The PLC-side display portion 5 and the PLC-side console 6 are arranged on the front panel of the CPU-mounted unit 3. In addition, the CPU-mounted unit 3 has communication ports to be connected to the PC 2 and the like.

Figure 21:
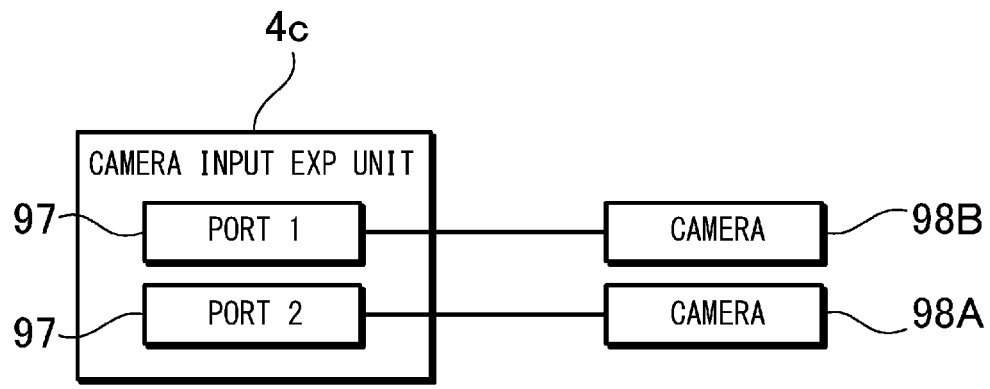
FIG. 21 is a schematic diagram showing connection between the camera input expansion unit and the cameras.

The camera input expansion unit 4*c* has substantially the same height as the CPU-mounted unit 3. Accordingly, they can be easily arranged side by side. The camera input expansion unit 4*c* has connection ports 97 as the image-capture interfaces 500 on its front panel. Two or more connection ports 97 can be provided. Two connection ports 97 are provided in the example of FIG. 18 so that different types of cameras 98A and 98B can be connected to these ports via camera connection cables 550. Two or more cameras 98 can be thus connected to the camera input expansion unit 4*c*. Also, in an example of FIG. 21, connection ports 97 as the image-capture interfaces 500 are provided which can receive the camera connection cable 550. Connectors of the camera connection cables 550 can be inserted into the connection ports 97 so that the cameras 98A and 98B are connected to the camera input expansion unit.

Examples of the camera 98 can be provided by two or more types of cameras such as wide angle camera, and high speed camera. The ports can be connected to different types of cameras 98. The cameras 98 have an imaging element on the front part of the rectangular box-shaped housing behind their lens 99. Also, a connection portion 552 to be connected to the camera connection cable 550 is arranged on the back-surface side of the camera 98.

Figure 22:
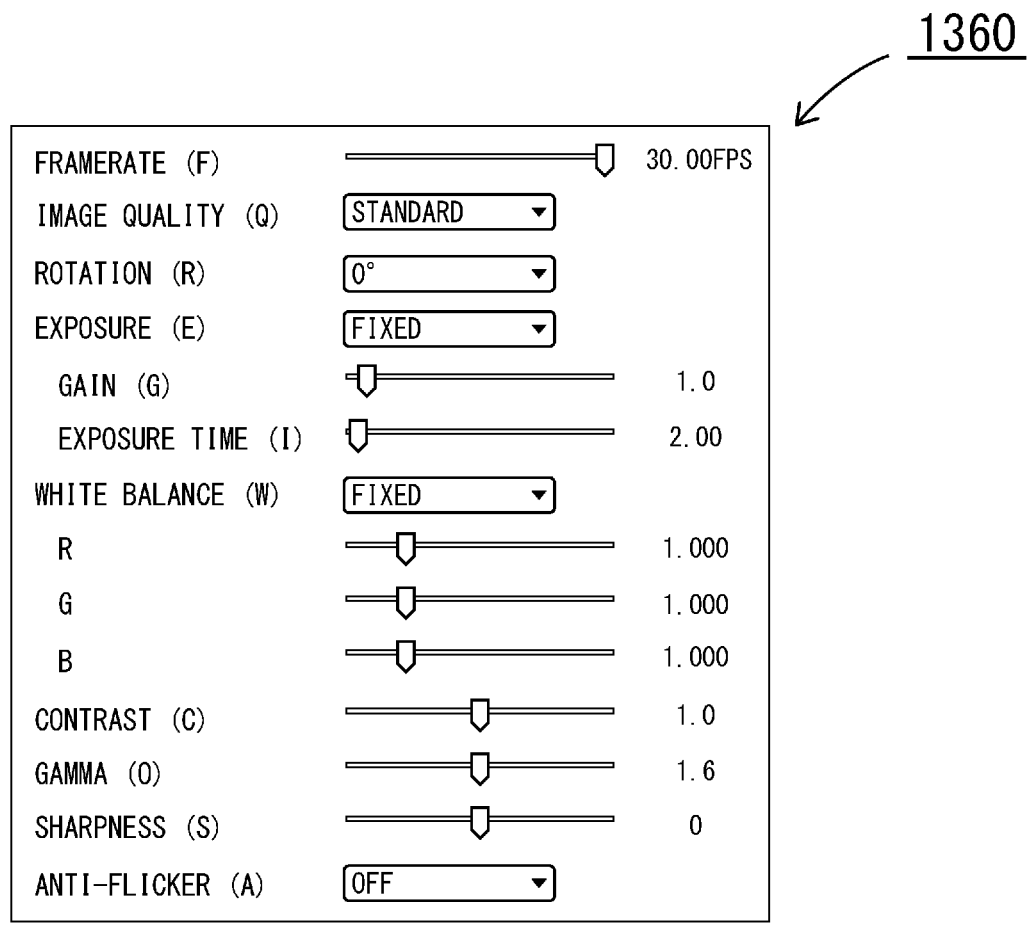
FIG. 22 is an image illustrating a setting screen for setting image-related conditions of the camera.

A camera-setting screen 1360 is shown as an example of camera-setting portion for image-related settings of the camera 98 in the GUI of FIG. 22. Users can make image-related settings as settings of the cameras corresponding to the connection ports through the camera-setting screen 1360. User-settable items are framerate, image quality, rotation, exposure, gain, exposure time, white balance, contrast, gamma, sharpness, an anti-flicker, and the like. The framerate is an image-capturing cycle, and can be defined in each camera 98. The instants of image capture of two cameras can be asynchronous to each other. In the case where two cameras have the same framerate, they can capture their images in synchronization with each other.

As shown in FIG. 22, the setting information of the camera includes parameters such as framerate, gain, exposure time, and contrast. These parameters are stored in a nonvolatile memory of the camera input expansion unit. Among the parameters shown in FIG. 22, parameters of gain and exposure time are read from the camera input expansion unit, and transmitted to the volatile memory of the camera. The transmission timing can be the power-ON timing of the programmable logic controller, or the like. For example, even if the camera is replaced with another camera, this configuration can define appropriate gain and exposure time of the new camera when programmable logic controller is turned ON. In this embodiment, neither the framerate nor the contrast is transmitted to the camera. In particular, the camera expansion unit processor of the camera input expansion unit generates an ON/OFF signal which defines an image capture trigger with reference to the framerate, and provides the ON/OFF signal to the camera. For example, in the case where the framerate is 30 fps, thirty ON/OFF signals are generated in one second.

Since the camera input expansion unit is connected via the image-capture-trigger line 501 to the camera 98 so that the ON/OFF signal are directly provided to the camera 98, there is an advantage that the camera input expansion unit can rapidly instruct the camera 98 when providing an image capture trigger. The captured images can be recorded and reproduced not only as a still image but also as moving images, and can be displayed on the display HMI, and the PC 2. Especially in the case of moving images, in order to transmit the image data at high speed, serial communication is used for the image-communication line 502. Accordingly, the speed of the image-communication line 502 can be increased. The image data transmission is now descried in detail with reference to a block diagram of FIG. 23 showing the connection via the image-communication line 502 between the camera 98 and the camera input expansion unit 4c.

Figure 23:
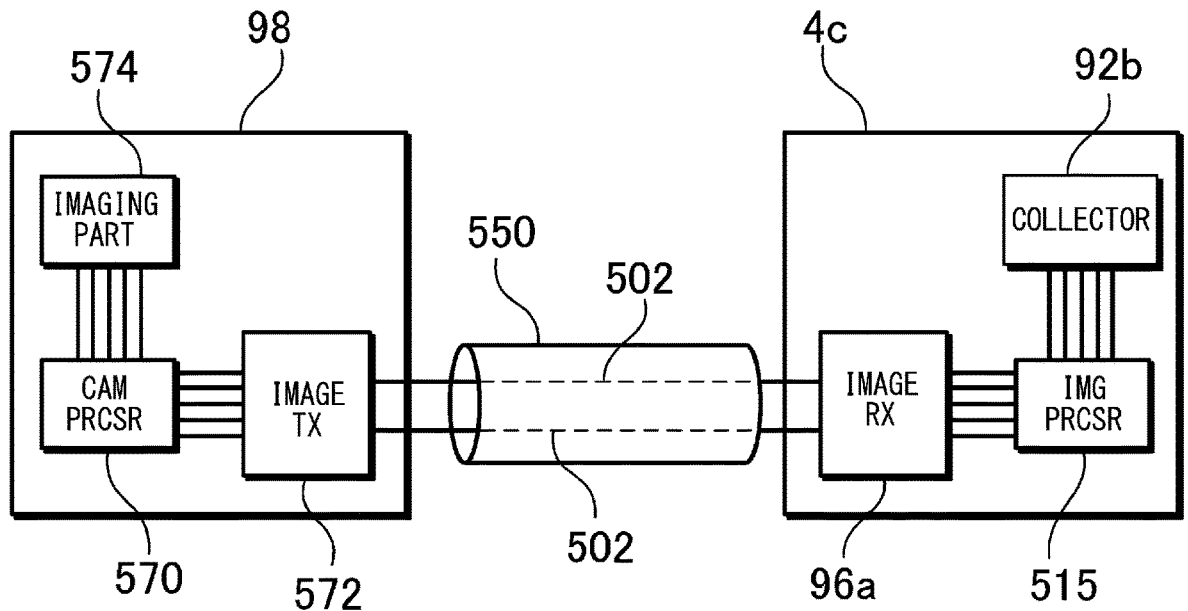
FIG. 23 is a schematic diagram showing the camera input expansion unit and the camera connected through an image-capture-trigger line to each other.

The camera 98 shown in FIG. 23 and the camera input expansion unit 4c are connected to each other via the image-communication line 502 which is included in the camera connection cable 550. The image-communication line 502 is constructed of a pair of data conductors, and transmits the same electrical signal as a differential pair of signals. Each differential signal is transmitted in its own data conductors. Image data which is captured by the image capture portion 574 such as a CMOS sensor of the camera 98 is transferred to the camera processing portions 570 such as an FPGA via parallel signal conductors. The camera processing portion 570 transfers the image data to the image transmission portion 572 via the parallel signal conductors. The image transmission portion 572 includes a serializer, and converts the parallel signal into a serial signal. The transmission speed of differential pairs of signals is not lower than 1300 Mbps, for example. This transmission speed is higher than 100 Mbps of Ethernet standards 100BASE-TX, etc. Accordingly, the image data can be displayed in VGA size at 120 fps or in QuadVGA size at 30 fps on the display HMI and the PC 2.

The camera input expansion unit 4c includes a deserializer in the image reception portion 96a which converts serial signals into parallel signals, and transmits the image data to the image-processing portion 515 via parallel signal conductors. The image-processing portion 515 transmits the image data to the collection portion 92b via parallel signal conductors. As discussed above, internal components in each of the camera 98, the camera input expansion unit 4c, and the like transmit/receive parallel signals to/from each other via parallel signal conductors. On the other hand, the units transmit/receive serial signals to/from each other via serial signal conductors so that the number of signal conductors can be reduced. The parallel signal conductors can transmit image data even at low speed. However, the number of parallel signal conductors is large. Accordingly, if the camera and the camera input expansion unit are connected by parallel signal conductors, the camera connection cable will be thick. For this reason, serial communication is used for the image-communication line in this embodiment. As a result, the number of signal conductors in the image-communication line can be small. Therefore, even in the case where the camera connection cable 550 is thin, the image data communication can be surely performed by such high speed serial communication.

<Logging Using Ring Buffer>

Figure 24:
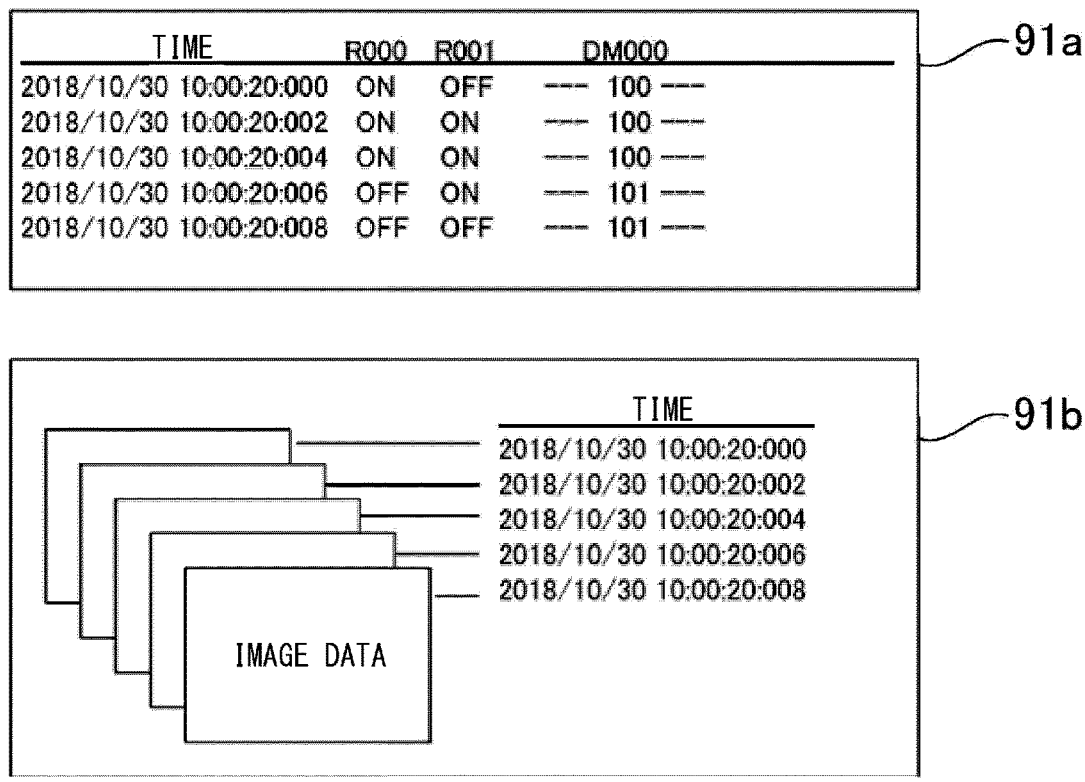
FIG. 24 is a diagram showing exemplary log data.

FIG. 24 shows device values and their corresponding time information which are held in the temporary recording portion 91a of the CPU-mounted unit 3. One record includes an acquired device value and the time information which indicates the instant when this device value is acquired.

FIG. 24 also shows image data and its associated time information which are held in the ring buffer 91b of the expansion unit 4. One record includes acquired image data and the time information which indicates the instant when this image data is acquired.

Figure 25:
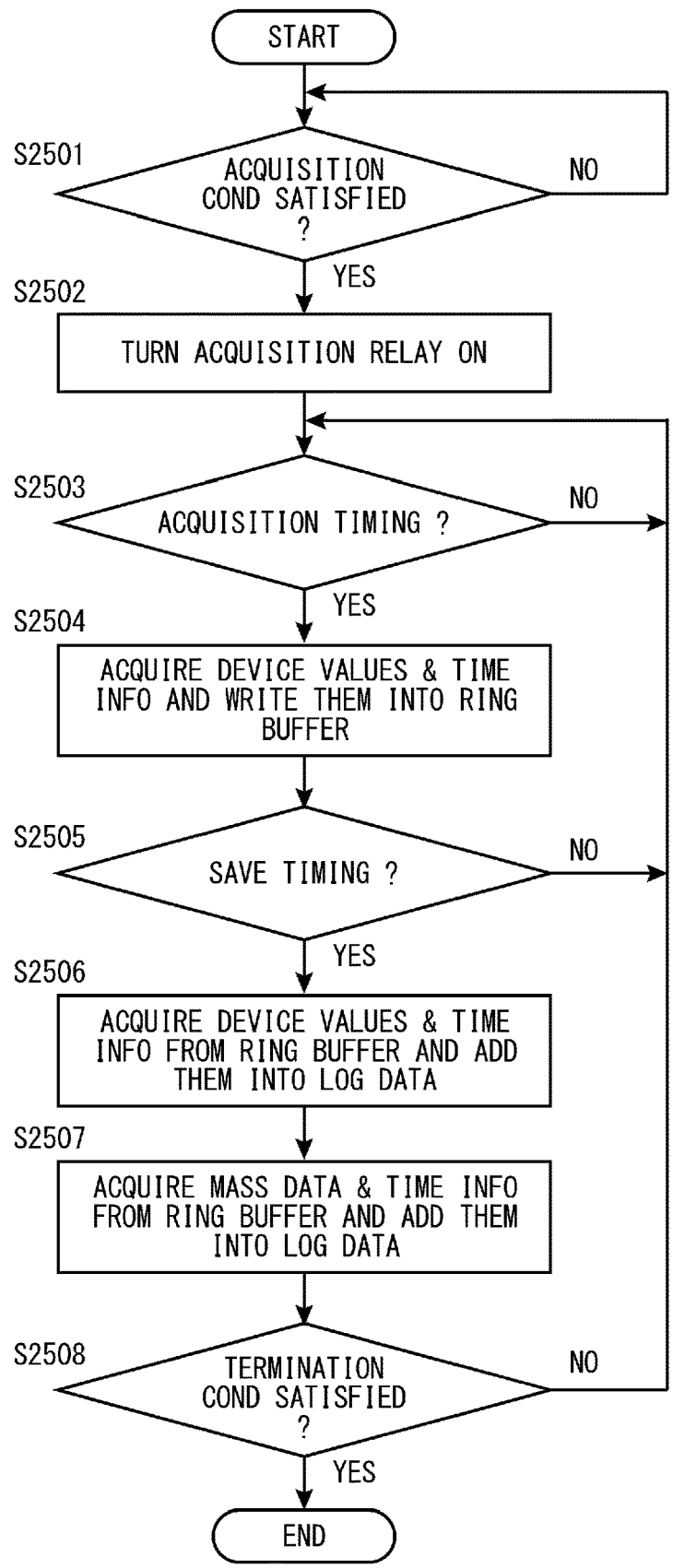
FIG. 25 is a flowchart showing logging procedure of the CPU-mounted unit.

FIG. 25 shows logging procedure of the CPU-mounted unit 3 using the temporary recording portion 91a. The CPU-mounted unit 3 includes the collection portion which reads a device value that is designated by the log setting data from the device values that are held in the device portion 34 from the device portion, and acquires time information from the time manager if predetermined collection start conditions are satisfied. The collection portion stores the device value and its corresponding time information which are associated with each other into the temporary recording portion 91a. The collection portion acquires the device values and their corresponding time information and stores them into the temporary recording portion 91a at every collection cycle (e.g., scanning cycle) which is designated by the log setting data 72.

The collection portion of the PLC-side CPU 31 determines whether acquisition conditions of device values are satisfied in step S2501. The acquisition conditions are conditions for starting storage of device values and their corresponding time information into the temporary recording portion 91a. The acquisition conditions can be described in the user program (e.g., the condition that a start relay is turned ON), or be described in the log setting data 72. If the acquisition conditions are satisfied, the PLC-side CPU 31 goes to step S2502.

The PLC-side CPU 31 (collection portion) turns an acquisition relay ON in step S2502. The acquisition relay is a 1-bit device and is a relay for instructing the expansion unit 4 to store data into the ring buffer 91b.

The PLC-side CPU 31 (collection portion) determines whether the time to acquire device values arrives (device value acquisition timing or not) in step S2503. For example, the acquisition timing can be scanning cycle (e.g., device values are acquired in END processing in every scan), and is defined by the log setting data 72. If the time to acquire device values arrives, the PLC-side CPU 31 goes to step S2504.

In step S2504, the PLC-side CPU 31 (collection portion) acquires device values designated by the log setting data 72 from the device portion 34 and acquires their corresponding time information from the time manager 83a of the CPU-mounted unit 3 so that the acquired device values and time information are written into the temporary recording portion 91a.

The PLC-side CPU 31 (collection portion) determines whether the time to save the acquired device values and time information arrives (save timing or not) in step S2505. The save timing is the time to save the information that is held in the temporary recording portion 91a into the log data 73. For example, the save timing can be occurrence of a predetermined event (e.g., save trigger), or the like. The save timing is also defined by the log setting data 72. If the time to save the information in the temporary recording portion does not arrive, the PLC-side CPU 31 returns to step S2503. If the time to save the information in the temporary recording portion arrives, the PLC-side CPU 31 goes to step S2506.

The PLC-side CPU 31 (collection portion) saves the information that is held in the temporary recording portion 91a into the log data 73 in step S2506. It is noted that the log setting data 72 may define information to be saved from the information that is held in the temporary recording portion 91a. For example, the defined information to be saved can be information that is acquired from occurrence of a certain event until a predetermined period of time elapses. Also, the defined information to be saved can be information that is acquired from the start time which is a predetermined period of time before occurrence of a certain event to the end time at which a predetermined period of time elapses from the occurrence of a certain event.

The PLC-side CPU 31 (collection portion) saves the information that is held in the ring buffer 91b of the expansion unit 4 into the log data 73 in step S2507. The collection portion can read the information that is held in the ring buffer 91b of the expansion unit 4 by using direct communication. More specifically, the collection portion may generate an instruction to read the information from the buffer memory. It is noted that the log setting data 72 may also define information to be saved from the information that is held in the ring buffer 91b. For example, the defined information to be saved can be information that is acquired from occurrence of a certain event until a predetermined period of time elapses. Also, the defined information to be saved can be information that is acquired from the start time which is a predetermined period of time before occurrence of a certain event to the end time at which a predetermined period of time elapses from the occurrence of a certain event.

The PLC-side CPU 31 (collection portion) determines whether termination conditions are satisfied in step S2508. The termination conditions are termination condition of the logging. The termination condition can also be defined by the log setting data 72. If the termination conditions are not satisfied, the PLC-side CPU 31 returns to step S2503. If the termination conditions are satisfied, the PLC-side CPU 31 terminates the logging procedure.

Figure 26:
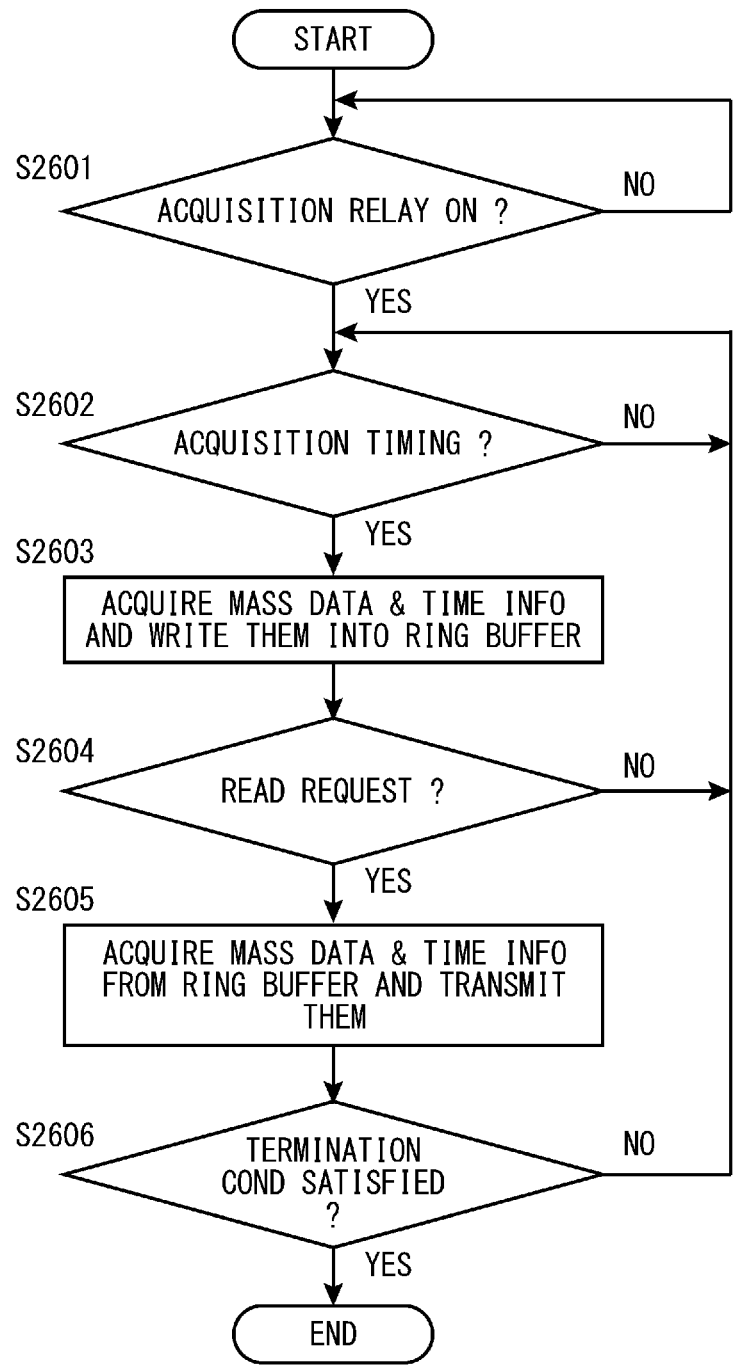
FIG. 26 is a flowchart showing logging procedure of the expansion unit.

FIG. 26 shows logging of the expansion unit 4 using the ring buffer 91b.

The CPU 41 (collection portion 92b) determines whether the acquisition conditions of the image data (e.g., the condition that a start relay is turned ON) are satisfied in step S2601. If the acquisition relay is turned ON, the CPU 41 goes to step S2602. Although the acquisition condition to be satisfied for acquiring the image data is the condition that the acquisition relay is turned ON in this embodiment, this condition is merely an example of such acquisition conditions. Alternatively, it can be determined that the acquisition conditions of the image data are satisfied if the PLC 1 is switched to the operation mode, for example. More specifically, the PLC 1 may include a mode switch which switches a setting mode (PROGRAM mode) of making various types of settings and the operation mode (RUN mode) of performing actual operations by repeatedly executing the ladder program. In this case, it can be determined that the acquisition conditions of the image data are satisfied if the mode switch switches from the PROGRAM mode to the RUN mode.

The CPU 41 (collection portion 92b) determines whether the time to acquire image data arrives (image data acquisition timing or not) in step S2602. For example, the acquisition timing can be an internal-control cycle (image-capture cycle) of the expansion unit 4, or the like. If the time to acquire image data arrives, the CPU 41 goes to step S2603.

The CPU 41 (collection portion 92b) acquires mass data and its associated time information, and stores them in the ring buffer 91b in step S2603. For example, the collection portion 92b generates a trigger signal, and provides it to the camera 98 and the time manager 83b. If receiving the trigger signal, the time manager 83b reads the time information from an internal clock, and will write the time information into the time-information buffer 95. The camera 98 captures an image based predetermined image-capture conditions, and provides image data corresponding to the captured image. The image reception portion 96a provides the image data to the collection portion 92b. The image reception portion 96a may directly write the image data into the ring buffer 91b. The collection portion 92b associates the time information that is read from the time-information buffer 95 and the image data that is acquired from the camera 98 with each other, and writes the associated time information and image data into the ring buffer 91b.

The CPU 41 (collection portion 92b) determined whether the CPU-mounted unit 3 generates a read request (read instruction) to the ring buffer 91b in step S2604. If receiving the read request, the CPU 41 goes to S2605. If the read request is not generated, the CPU 41 returns to step S2602.

The CPU 41 (collection portion 92b) acquires image data as mass data and its associated time information from the ring buffer 91b, and transmits them to the CPU-mounted unit 3 in step S2605.

The CPU 41 (collection portion 92b) determines whether termination conditions are satisfied in step S2606. For example, the collection portion 92b determines whether the acquisition relay is turned OFF. If the termination conditions are not satisfied, the CPU 41 returns to step S2602. If the termination conditions are satisfied, the CPU 41 terminates the logging procedure.

<Connection Form>

Figure 27:
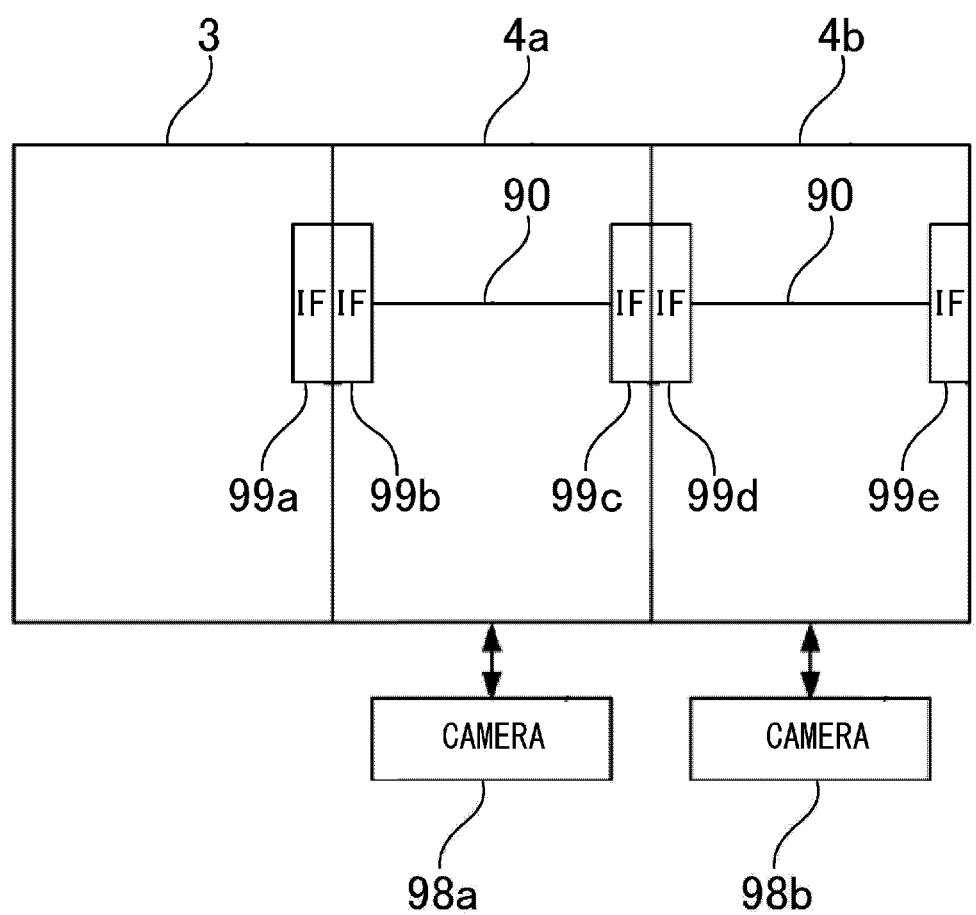
FIG. 27 is a diagram showing a connection form of PLCs.

FIG. 27 shows a connection form of building-block type PLC 1. The CPU-mounted unit 3 includes an IF 99a on its right side surface for connection to and communication with the expansion unit 4. IF is the abbreviated name for an interface. In this example, the expansion unit 4a is connected to the CPU-mounted unit 3, and another expansion unit 4b is connected to the expansion unit 4a. The expansion units 4 include IFs 99 on both their right and left side surfaces. The right side surface of the CPU-mounted unit 3 is opposed to the left side surface of the expansion unit 4a. According to this arrangement, the IF 99a of the CPU-mounted unit 3 is connected to an IF 99b which is arranged on the left side surface of the expansion unit 4a. The right side surface of the expansion unit 4a is opposed to the left side surface of the expansion unit 4b. According to this arrangement, an IF 99c of the expansion unit 4a is connected to an IF 99d which is arranged on the left side surface of the expansion unit 4b. An IF 99e which is arranged on the right side surface of the expansion unit 4b may be connected to an end unit. The unit-to-unit bus 90 is formed by the IFs 99a to 99e. For example, image data captured by the camera 98a connected to the expansion unit 4a can be transmitted to the CPU-mounted unit 3 via the unit-to-unit bus 90. Image data captured by the camera 98b connected to the expansion unit 4b can be also transmitted to the CPU-mounted unit 3 via the unit-to-unit bus 90.

In this building-block type PLC 1, the side surfaces of the unit serve as connection surfaces (surfaces to be coupled). The IFs 99 each of which can form a part of the unit-to-unit bus 90 are arranged on the side surfaces of the unit. As discussed above, the communication using the unit-to-unit bus 90 is controlled by the bus master 38 shown in FIG. 5.

Figure 28:
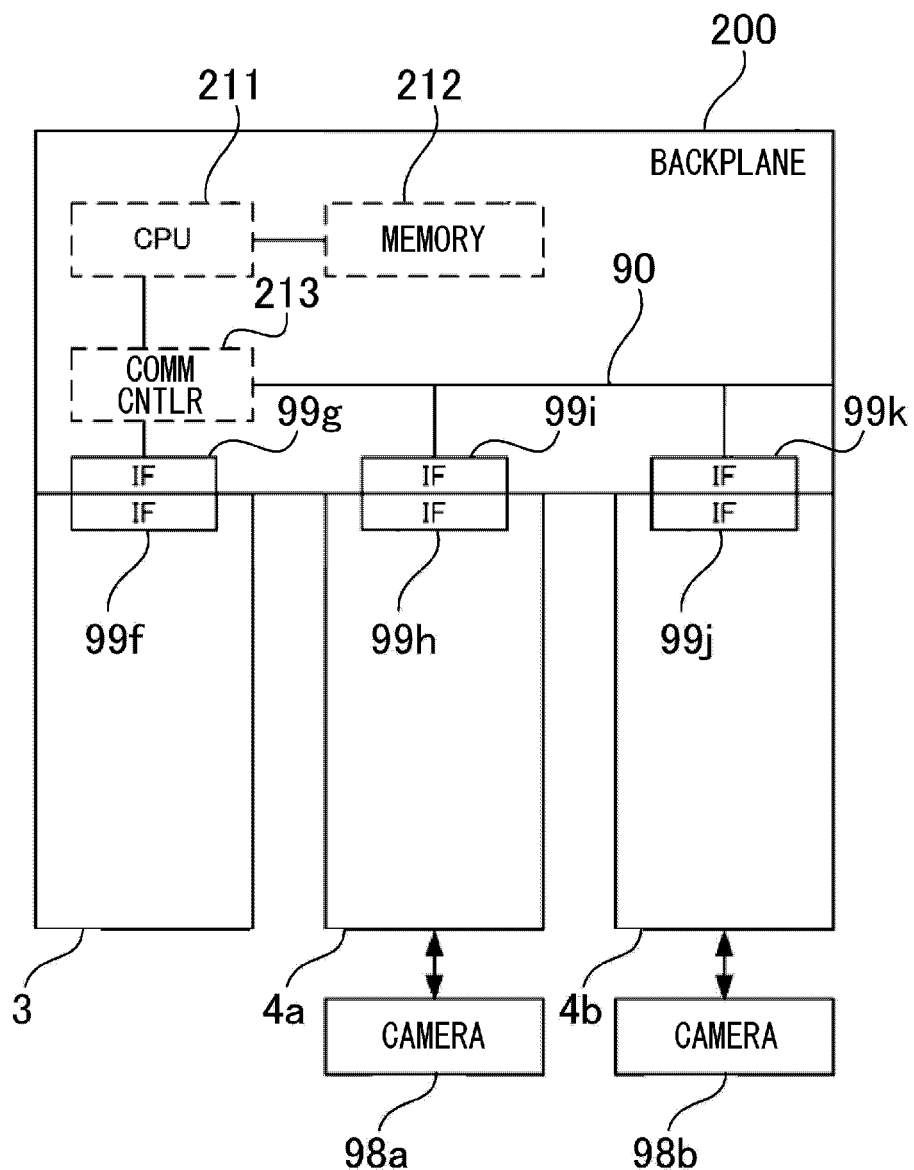
FIG. 28 is a diagram showing another connection form of PLCs.

FIG. 28 shows an connection form of the PLC 1 which includes the backplane 200. The backplane 200 is connected to the bottom surfaces of the CPU-mounted unit 3 and of the expansion units 4, or is connected to the back surfaces of the CPU-mounted unit 3 and of the expansion units 4. The backplane 200 serves as a support plate (base plate) which supports the CPU-mounted unit 3 and the expansion units 4. Here, their back surfaces are illustratively described as the connection surfaces. The back surface of the CPU-mounted unit 3 is opposed to the front surface of the backplane 200. Accordingly, an IF 99f which is arranged on the back surface of the CPU-mounted unit 3 is connected to an IF 99g which is arranged on the front surface of the backplane 200. The back surfaces of the expansion units 4 are opposed to the front surface of the backplane 200. An IF 99h which is arranged on the back surface of an expansion unit 4a is connected to an IF 99i which is arranged on the front surface of the backplane 200. An IF 99j which is arranged on the back surface of an expansion unit 4b is connected to an IF 99k which is arranged on the front surface of the backplane 200. The unit-to-unit bus 90 is formed by the IFs 99f to 99k.

The backplane 200 may have a communication-control portion 213 which controls bus communication via the unit-to-unit bus 90. Also, the backplane 200 may have a CPU 211 and a memory 212. The memory 212 may have a memory card as well as RAM and ROM. In this case, the CPU 211 may serve as the collection portion 92b or the saving portion. Also, the memory 212 may include a ring buffer. Alternatively, the CPU 211 may include the time manager 83b and the collection portion. In this case, the memory 212 includes the ring buffer 91b.

<Example of Log Display>

In addition to device values in operating record saving and image data of the camera 98, log data includes user programs such as ladder programs included in project data in the operating record saving and setting files of the units. For example, log data includes information such as image data captured by the camera 98, the statuses of units, the angles and coordinates of motion units, and the like in trouble occurrence. Accordingly, past statuses and connection conditions of the devices, past information on units, and the like can be saved in log data. Therefore, past states can be reproduced by saving the log data. That is, since what settings are made and what outputs are provided can be confirmed, it is useful to determine the cause of a trouble. By reading such log data by using a PLC engineering tool, the settings and the like which are saved in the log data can be analyzed, and the states can be reproduced and displayed.

Figure 29:
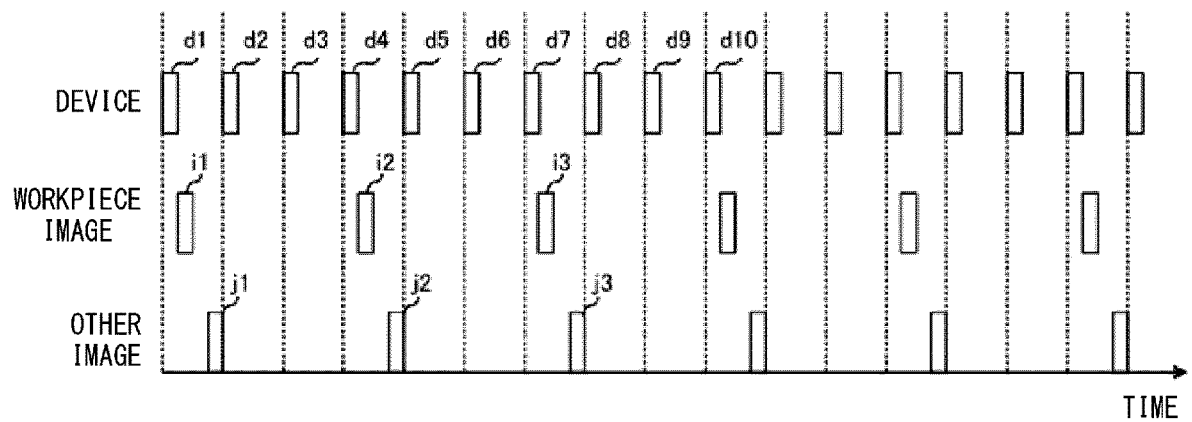
FIG. 29 is a diagram illustrating the logging timing.

FIG. 29 shows an example of log data 73. This example represents the acquisition timing of device values d1 to d10, workpiece images i1 to i3 acquired by the camera 98a, and other images j1 to j3 acquired by the camera 98b. The device values d1 to d10 are acquired at every scanning cycle. The workpiece images i1 to i3 are captured when trigger signals are generated. The workpiece images j1 to j3 are captured when trigger signals are generated. The horizontal positions of data indicate time information. As shown in FIG. 29, the acquisition times or acquisition cycles of the data do not agree with each other. For this reason, a log-display control portion 61 adjusts the display timing of the data based on the time information of the data.

Figure 30:
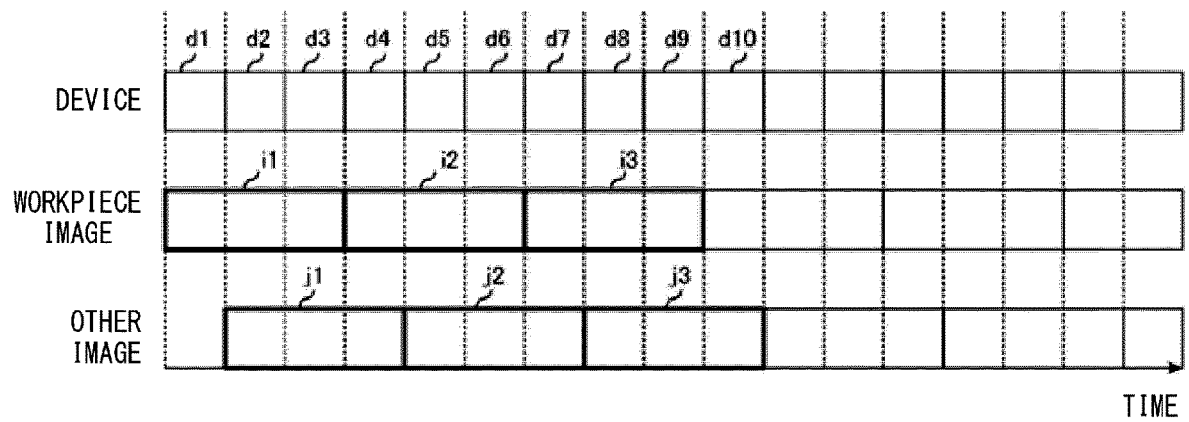
FIG. 30 is a diagram illustrating representations of log data.

FIG. 30 is a diagram illustrating the display timing and display duration of the log data 73. The log-display control portion 61 displays device values on the display portion 7 based on the time information of the device values. For example, the log-display control portion 61 determines the display duration of the device value d1 by calculating the time difference between the time information of the device value d1 and the time information of the device value d2. When the display duration elapses after the display of the device value d1 starts, the log-display control portion 61 starts display of the device value d2. After that, display durations are similarly calculated, and displayed device value is changed from one after another in accordance with the time information and the display durations.

As already shown in FIG. 29, the acquisition time of the device value d1 does not agree with the acquisition time of the workpiece image i1. For this reason, the log-display control portion 61 compares the acquisition time of the workpiece image i1 with the acquisition times of the device values d1 to d10, and selects the time-nearest device value dx which is the nearest to the acquisition time of the workpiece image i1. In this example, the time-nearest device value which is the nearest to the capture time of the workpiece image i1 is the acquisition time of the device value d1. Accordingly, the log-display control portion 61 simultaneously starts displaying the workpiece image i1 with the device value d1. Subsequently, the log-display control portion 61 determines the time-nearest device value dx which corresponds to the nearest acquisition time to the acquisition time of the workpiece image i2. In this example, the acquisition time of the device value d4 is the nearest to the acquisition time of the workpiece image i2. Accordingly, when the time to display the device value d4 arrives, the log-display control portion 61 simultaneously starts displaying the device value d4 and the workpiece image i2. Also, the log-display control portion 61 determines the time-nearest device value dx which corresponds to the nearest acquisition time to the acquisition time of another image j1. In this example, the time-nearest device value which is the nearest to the acquisition time of the another image j1 is the acquisition time of the device value d2. Accordingly, when the time to display the device value d2 arrives, the log-display control portion 61 simultaneously starts displaying the device value d2 and the another image j1.

The display timing of data items can be adjusted on the basis of the data item which has the shortest logging cycle in the data items which are included in the log data 73 as discussed above.

The programmable logic controller and camera input expansion unit according to the present invention can be suitably used for troubleshooting of a PLC system in FA.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

REFERENCE SIGNS LIST

1 . . . PLC
2 . . . PC
3 . . . CPU-mounted unit
4, 4a, 4b . . . Expansion unit
4c . . . Camera input expansion unit
4ds . . . Motion unit
4e . . . Communication unit
5 . . . PLC-side display portion
6 . . . PLC-side console
7 . . . Display portion
8 . . . PC-side console
9 . . . Communication cable
10, 10a, 10b . . . Field device
11 . . . PC-side memory portion
21, 21B . . . PC-side CPU
22 . . . PC-side storage device
23 . . . PC-side communication portion
31 . . . PLC-side CPU
32 . . . PLC-side storage device
33 . . . PLC-side communication portion
34 . . . Device portion
34a . . . CPU-mounted-unit device portion; 34b . . . Expansion unit device portion
35 . . . Project storage portion
36 . . . Save memory; 36A . . . Memory card
37 . . . Internal memory
38 . . . Bus master
39 . . . Record control portion 41 . . . CPU
42 . . . Memory
45 . . . Save-condition setting portion
50C . . . Save control portion
71 . . . Project data
72 . . . Log setting data
73 . . . Log data
80 . . . Execution portion
80a . . . Ladder-execution engine
80b . . . Unit control portion
81 . . . Recording portion
82 . . . Detection portion
83 . . . Time manager
83a . . . Time manager
83b . . . Time manager
84 . . . Output portion
90 . . . Unit-to-unit bus
91a . . . Temporary-recording-portion; 91b . . . Ring buffer
92b . . . Collection portion
92a . . . Collection portion
93 . . . Saving portion
94 . . . Transmission portion
95 . . . Time-information buffer
96 . . . Function-execution portion
96a . . . Image reception portion
97 . . . Connection port
98, 98a, 98b, 98A, 98B . . . Camera
99 . . . Lens
99a-99k . . . IF
200 . . . Backplane
201 . . . Unit-to-unit communication
202 . . . Program execution
204 . . . END processing
211 . . . CPU
212 . . . Memory
213 . . . Communication-control portion
500 . . . Camera connection interface
500B . . . Camera-side image-capture interface
501 . . . Image-capture-trigger line
502 . . . Image-communication line
503 . . . Power supply line
510 . . . Camera expansion unit processor
511 . . . Bus transmission/reception portion
512 . . . Protocol interpretation portion
513 . . . Protocol-execution portion
514 . . . Program-execution portion
515 . . . Image-processing portion
517 . . . Image-capture-trigger generator
520 . . . Image-recorder
522 . . . Time-information primary buffer
524 . . . Power supply portion
530 . . . Camera-setting-information storage portion
550 . . . Camera connection cable
552 . . . Connection portion
560 . . . Bus connector
570 . . . Camera processing portion
571 . . . Image-capture-trigger input portion
572 . . . Image transmission portion
573 . . . Power reception portion
574 . . . Image capture portion
575 . . . Camera-setting recording portion
1000 . . . Programmable-logic-controller system
1360 . . . Camera-setting screen
Ld . . . Ladder diagram
T . . . Scan time
d1-d10 . . . Device value
WK . . . Object
NT . . . Communication network
VC . . . Video camera
PS . . . External power source
CL . . . Communication line
i1-i3 . . . Workpiece image
j1-j3 . . . Workpiece image

What is claimed is:

1. A programmable logic controller comprising:
a CPU-mounted unit that executes a user program, and monitors or controls external equipment by repeatedly executing the user program; and
a camera input expansion unit that is electrically connected to said CPU-mounted unit through a bus, and that is connectable to an external camera that captures an image of a predetermined area based on an image capture trigger generated in said programmable logic controller and generate image data corresponding to the captured predetermined area,
the camera input expansion unit including:
a camera-setting-information storage portion that stores setting information on said external camera, the setting information including the conditions of said image capture trigger,
a camera expansion unit processor that generates an ON/OFF signal defining said image capture trigger based on the setting information on said external camera, which is stored in said camera-setting-information storage portion, and acquires the image data which is generated by said external camera based on the ON/OFF signal as said image capture trigger,
an image-recorder that records the image data which is acquired by said camera expansion unit processor, and
an image capture interface that is provided between said camera expansion unit processor and said external camera, and has an image-capture-trigger line propagating said ON/OFF signal to said external camera and an image communication line propagating the image data which is generated by said external camera to said camera expansion unit processor.

2. The programmable logic controller according to claim 1,
wherein the user program is editable with a programming support device that is connectable to said CPU-mounted unit,
wherein the setting information includes setting information that is defined by said programming support device and is received through said CPU-mounted unit.

3. The programmable logic controller according to claim 1 further comprising
a base plate that holds said CPU-mounted unit and said camera input expansion unit,
wherein said camera input expansion unit is electrically connected through the bus which is provided in said base plate to said CPU-mounted unit.

4. The programmable logic controller according to claim 1, wherein said image-recorder is configured to record the image data which is acquired by said camera expansion unit processor and the information on time of its corresponding image data acquisition which are associated with each other in chronological order, and to provide said image data and said information on time of its corresponding image data acquisition based on instruction from said CPU-mounted unit.

5. The programmable logic controller according to claim 1, wherein said image-capture-trigger line is a non-communication line.

6. The programmable logic controller according to claim 1,
wherein said image-capture interface further includes a power supply interface to supply electric power to said external camera,
wherein said image communication line, said image-capture-trigger line, and said power supply line are bundled together and form a camera connection cable that connects said image-capture interface and said external camera to each other.

7. The programmable logic controller according to claim 1, wherein said image-communication line has a transmission speed that is not smaller than 130 Mbps.

8. The programmable logic controller according to claim 1,
wherein said camera expansion unit processor includes
an image-capture-trigger generator that generates said ON/OFF signal to be sent to said external camera through said image-capture-trigger line, and
a collection portion that associates the information on time of the sending of said ON/OFF signal with its corresponding image data which can be generated by said external camera, and records the associated information on time and image data into said image-recorder.

9. The programmable logic controller according to claim 1,
wherein time managers are provided in said CPU-mounted unit and camera input expansion unit,
wherein times of said CPU-mounted unit and said camera input expansion unit are synchronized with each other by using said time managers, which are included in said CPU-mounted unit and said camera input expansion unit.

10. The programmable logic controller according to claim 9,
wherein said time manager is a counter,
wherein said information on time of image data acquisition is a counter value.

11. The programmable logic controller according to claim 1, wherein said camera expansion unit processor is configured to control the image capture trigger based on a ladder program in which said image capture trigger is described.

12. The programmable logic controller according to claim 1, wherein said ON/OFF signal defining said image capture trigger is provided based on any of a timer, an external input, and abnormality detection.

13. The programmable logic controller according to claim 1, wherein said camera expansion unit processor is configured to interpret or execute the protocol of refresh communication, or to transmit data to another expansion unit that is executed by said camera expansion unit in each scan.

14. The programmable logic controller according to claim 1, wherein said camera input expansion unit comprises a plurality of camera input expansion units.

15. The programmable logic controller according to claim 14, wherein images of a common object can be captured from different directions by cameras that can be connected to their corresponding one of the plurality of camera input expansion units and synchronized with each other.

16. The programmable logic controller according to claim 14, wherein images of a common object can be captured at a different phase(s) by cameras that can be connected to their corresponding one of the plurality of camera input expansion units.

17. A camera input expansion unit to be electrically connected through a bus to a CPU-mounted unit to configure a programmable logic controller, the camera input expansion unit comprising:
a camera-setting-information storage portion that stores setting information including conditions of an image capture trigger for an external camera that captures an image of a predetermined area based on said image capture trigger generated by and sent from said programmable logic controller and generate image data corresponding to the captured predetermined area;
a camera expansion unit processor that generates an ON/OFF signal defining said image capture trigger based on the setting information, which is stored in said camera-setting-information storage portion, and acquires the image data which is generated by said external camera based on the ON/OFF signal as said image capture trigger;
an image-recorder that records the image data which is acquired by said camera expansion unit processor; and
an image capture interface that is provided between said camera expansion unit processor and said external camera, and has an image-capture-trigger line propagating said ON/OFF signal to said external camera and an image communication line propagating the image data which is generated by said external camera to said camera expansion unit processor.

* * * * *